United States Patent [19]

Ishii et al.

[11] Patent Number: 6,096,144

[45] Date of Patent: *Aug. 1, 2000

[54] METHOD OF PRODUCING HYDROGEN ABSORBING ALLOY POWDER, AND ELECTRODE USING HYDROGEN ABSORBING ALLOY POWDER PRODUCED BY SAID METHOD

[75] Inventors: Masatoshi Ishii; Hiroyuki Miyamoto, both of Takefu; Hajime Kitamura, Ibaraki-ken, all of Japan

[73] Assignee: Shin-Etsu Chemical Co., Ltd., Tokyo, Japan

[*] Notice: This patent is subject to a terminal disclaimer.

[21] Appl. No.: 08/947,028

[22] Filed: Oct. 8, 1997

[30] Foreign Application Priority Data

Oct. 9, 1996 [JP] Japan ..................... 8-287584
Oct. 9, 1996 [JP] Japan ..................... 8-287585

[51] Int. Cl.$^7$ ..................................... H01M 4/08
[52] U.S. Cl. ................... 148/513; 420/900; 429/218.2
[58] Field of Search ..................... 148/513, 514; 75/370; 420/900; 429/218.2

[56] References Cited

U.S. PATENT DOCUMENTS

| 4,555,395 | 11/1985 | Sirovich et al. ............. 420/900 |
| 5,695,530 | 12/1997 | Hong et al. ............. 429/218.2 |
| 5,858,571 | 1/1999 | Ishii et al. ............. 420/900 |

*Primary Examiner*—George Wyszomierski
*Attorney, Agent, or Firm*—Millen, White, Zelano, & Branigan, P.C.

[57] ABSTRACT

A method of producing a hydrogen absorbing alloy powder, which comprises a step of treating a pulverized hydrogen absorbing alloy with an acidic or alkaline solution of conjugated unsaturated compound having at least 5 conjugated π bonds; and a negative electrode using a hydrogen absorbing alloy powder produced by the aforesaid method, which can ensure high initial activity and high initial capacity in the nickel-hydrogen secondary battery provided therewith.

20 Claims, No Drawings

METHOD OF PRODUCING HYDROGEN ABSORBING ALLOY POWDER, AND ELECTRODE USING HYDROGEN ABSORBING ALLOY POWDER PRODUCED BY SAID METHOD

FIELD OF THE INVENTION

The present invention relates to a hydrogen absorbing alloy powder having excellent keeping quality and, particularly to, a method of producing a hydrogen absorbing alloy powder which can provide an electrode having satisfactory initial activity when it is used in the negative electrode of a nickel-hydrogen secondary battery. Further, the invention concerns an electrode using the hydrogen absorbing alloy powder produced by the aforesaid method.

BACKGROUND OF THE INVENTION

Since the alloys capable of absorbing and desorbing hydrogen (which are abbreviated as "hydrogen absorbing alloys" hereinafter) were discovered, they have been applied to not only a hydrogen absorbing means but also a battery and the like. In particular, alkaline secondary batteries utilizing such alloys were already used practically, and the hydrogen absorbing alloys used therein have undergone successive improvements with the intention of heightening the battery capacity and lengthening the battery life.

More specifically, in the first studied $LaNi_5$ hydrogen absorbing alloy having a $CaCu_5$ type crystal structure, it has been tried to partially replace the La by other rare earth elements, such as Ce, Pr and Nd, and the Ni by other metal elements, such as Al, Co and Mn, thereby enabling the secondary battery to have a higher capacity and a longer life.

However, such a replacement in the hydrogen absorbing alloy caused a drop in the initial activity of a secondary battery when the resultant alloy was used for a negative electrode of the battery although it was successful in heightening the battery capacity and lengthening the battery life.

The initial activity of a secondary battery is, in general, expressed in terms of the number of charge-discharge cycles repeated until the battery reaches the maximum capacity, so that the initial activity is considered to be higher the smaller such a number is. Usually, the initial activity is evaluated by the capacity in the first cycle and the number of charge-discharge cycles repeated until the battery reaches the maximum capacity.

When a secondary battery having a low initial activity is sealed hermetically, the balance between positive and negative electrodes is lost which decreases the battery capacity and the battery life.

In order to solve the aforementioned problem, it has so far been carried out to treat hydrogen absorbing alloys with acids or alkalis. However, these treatments have defects that not only the alloy is subject to surface oxidation during treatment but also the treated alloy is liable to oxidation upon drying and storage, so that they are insufficient in the ease of the handling and cannot ensure sufficient stability in the treated alloy.

SUMMARY OF THE INVENTION

In the course of intensive studies made for obviating the foregoing defects from hydrogen absorbing alloy powders for the negative electrode of a secondary battery and methods of producing such alloy powders, the present inventors found that, when a pulverized hydrogen absorbing alloy was treated with a solution comprising an unsaturated compound having at least 5 conjugated π bonds and a molecular weight of at least 100 (which is called "a highly conjugate unsaturated compound" hereinafter), the resultant hydrogen absorbing alloy powder had markedly improved keeping quality and easiness of handling due to the surface covering effect of the highly conjugate unsaturated compound, and further discovered that, when the aforesaid treatment, or the treatment with a solution comprising a highly conjugate unsaturated compound, was carried out after a pulverized hydrogen absorbing alloy was treated with an aqueous solution of alkali or mineral acid to elevate the surface activity thereof, the pulverized hydrogen absorbing alloy underwent further improvements in the keeping quality and the easiness of handling as the surface activity thereof was kept. The result mentioned above has already been subject to a patent application.

As the result of a continuance of experimental research on more effective treatments for hydrogen absorbing alloy powders, the present inventors have found that, when the treatment with a solution of highly conjugate unsaturated compound is carried out in a condition that the solution is alkaline or acidic, the treatment can be effected with higher certainty and the treatment process can be simplified to result in greatly improved efficiency and provide a considerable economical advantage, thereby achieving the present invention.

The method according to the present invention is therefore characterized by the treatment with an acidic or alkaline solution containing a highly conjugate unsaturated compound. And this treatment enables the production of a hydrogen absorbing alloy powder having excellent keeping quality and easiness of handling. In addition, it has become clear by a thorough examination of the experimental results that the ways and the conditions suitable for this treatment were almost the same as those adopted in the treatment with a solution of highly conjugated unsaturated compound.

Further, it has been proved that, when the hydrogen absorbing alloy powder treated with an acidic or alkaline solution of highly conjugate unsaturated compound was used for the negative electrode of a nickel hydride secondary battery, the battery had an improved initial activity without attending decrease in capacity and lifetime.

Therefore, a first object of the present invention is to provide a method of producing a hydrogen absorbing alloy powder having excellent keeping quality and easiness of handling.

A second object of the present invention is to provide a negative electrode used for a nickel hydride secondary battery having an excellent initial activity.

The aforementioned objects of the present invention are attained by a method of producing a hydrogen absorbing alloy powder, which comprises a step of treating a pulverized hydrogen absorbing alloy with an acidic or alkaline solution of a conjugated unsaturated compound having at least 5 conjugated π bonds and a molecular weight of at least 100.

DETAILED DESCRIPTION OF THE INVENTION

The hydrogen absorbing alloy used in the present invention has no particular restriction, but it can be selected properly from hydrogen absorbing alloys known to be usable for negative electrodes, including hydrogen absorbing Ti alloys of $AB_n$ (n=1 or 2) type, hydrogen absorbing Zr alloys of $AB_2$ type and hydrogen absorbing rare earth alloys of $AB_5$ type. In particular, the use of a hydrogen absorbing alloy of $MmNi_5$ type is appropriate from the viewpoint of ensuring a satisfactory cycle life in the secondary battery. The symbol Mm in the foregoing composition is referred to as "a Mish metal", or a mixture of rare earth elements including La, Ce, Pr, Nd and the like. In view of further improvement in cycle life, it is desirable for the hydrogen absorbing alloy of $MmNi_5$ type that the nickel thereof is partially replaced by not only Mn but also Al, and further by Co.

The hydrogen absorbing alloys especially preferred in the present invention are alloys represented by compositional formula $(La)_xR_{1-x}(Ni_aM_b)$, wherein R is Ce, Pr, Nd or a mixture of two or more thereof, M is at least one metallic element selected from a group consisting of Al, Co, Cu, Fe, Mn, Ti and Zr, x is from 0.2 to 1, a+b is from 4.0 to 6.0 and $0<b\leq2.0$.

In the present invention, a pulverized hydrogen absorbing alloy is treated with an acidic or alkaline solution of highly conjugated unsaturated compound for the purpose of producing a hydrogen absorbing alloy powder which has a high keeping quality and easiness of handling and further ensures a satisfactory initial activity in a secondary battery when the alloy is used for the negative electrode of the battery. In particular, it is beneficial for the pulverized alloy to be treated with an acidic solution of highly conjugated unsaturated compound.

In the treatment according to the present invention, the solution used has no particular restriction as to an acid for conferring an acidity thereon. Although the acid can be selected properly from known mineral acids, it is desirable to use hydrochloric acid, sulfuric acid, nitric acid or a mixture of two or more thereof. In particular, hydrochloric acid is preferred over the others.

Also, the solution used has no particular restriction as to an alkali for conferring an alkalinity thereon. The alkali can be selected properly from known alkalis. Of known alkalis, however, lithium hydroxide, sodium hydroxide, potassium hydroxide or a mixture of two or more thereof is used to advantage. In particular, lithium hydroxide is preferred over the others.

This treatment is carried out at a temperature ranging from ordinary (i.e., room) temperature to 130° C., preferably from 40° C. to 110° C., and it may be performed under a pressure of from ordinary (i.e., atmospheric) pressure to 10 $kgf/cm^2$ in an airtight vessel, if desired. The treatment performed under a high temperature or while cooling is undesirable in view of economy, because it entails too high cost of equipment and facilities for the production in an industrial scale. In particular, the treatment carried out while cooling is impractical, because the treatment time becomes too long.

The treatment time is preferably chosen from the range of 0.1 to 10 hours, and adjusted properly depending on the treatment temperature. In other words, the treatment time is shortened when the treatment temperature is high; while it is lengthened when the treatment temperature is low.

With respect to the concentration of a treating bath, it is desirable that the mineral acid concentration be from 0.05 to 1.0 N or the alkali concentration be from 1.0 to 10.0 N. When the concentration of a mineral acid or alkali is below the foregoing lower limit, sufficient activation effects cannot be produced; while, when the condentration is beyond the foregoing upper limit, the treatment proceeds to the interior of the alloy to cause a decrease in hydrogen storage capacity.

The suitable amount of a highly conjugated unsaturated compound used in a treating bath is from 0.01 to 10 parts by weight per 100 parts by weight of the hydrogen absorbing alloy to be treated (or about 0.01 to 10 weight %, expressed in concentration). When the compound is used in an amount smaller than the foregoing lower limit, it cannot ensure satisfactory keeping quality in the alloy powder; while, when the amount used is increased beyond the foregoing upper limit, the hydrogen absorbing-desorbing reaction is suppressed to result in a decrease of hydrogen storage capacity.

The highly conjugated unsaturated compound which can be used in the present treatment is an aromatic or heterocyclic compound having at least 5 conjugated π bonds per molecule. The term "a conjugated π bond" used herein means a double or triple bond which is a member of a conjugate bonding system. When the number of conjugated π bonds present in an unsaturated compound is less than 5 and the molecular weight thereof is less than 100, the compound cannot have appreciable effect upon the initial activity.

In the present invention, those highly conjugated unsaturated compounds are required to have a molecular weight of at least 100. The desirable molecular weight thereof is at least 200, particularly from 200 to 50,000.

As for the aromatic compound having at least 5 conjugated π bonds which can be used in the present invention, benzene derivatives, naphthalene derivatives, polynuclear aromatic compounds, quinones and nonbenzenoid aromatic compounds are examples thereof. And, as for the heterocyclic compound having at least 5 conjugated π bonds which can be used in the present invention, oxygen-containing heterocyclic compound, nitrogen-containing heterocyclic compounds, sulfur-containing heterocyclic compounds, bicyclic compounds having a nitrogen in common, and alkaloids are examples thereof. Of those compounds, polynuclear aromatic compounds are preferred over the other aromatic compounds, and oxygen- or nitrogen-containing heterocyclic compounds are preferred over the other heterocyclic compounds.

In the first place, specific examples of an aromatic compound having at least 5 conjugated π bonds are enumerated below.

With respect to the benzene derivatives, the following are examples thereof:

phenols and derivatives thereof, such as 2,6-di-tert-butylphenylphenol, catecholphthalein, 2,2-diphenylolpropane, 3,7-dihydroxy-10-methylxanthene, phenolphthalein, 7-hydroxy-2,4-dimethylbenzopyrooxonium chloride, hydroxyanthraquinone, purpurogallin, Gallein, diphenylether, α-methoxyphenazine, chloroglucide, 2,3-dihydroxyanthraquinone, 5,7-dihydroxy-4-methylcoumarine, dihydroxyacridone, salicylic acid, α-Hydrindone, β-phenylbutyrophenyl, N-2,4-dinitrophenyl-N-phenylhydroxylamine, acetophenone, 1-(4-nitrophenyl)-3,5-dimethylpyrazole and 9,10-diphenylphenanthrene;

aromatic amines and derivatives thereof, such as N-phenyl-p-benzoquinonediimine, quinoline, Safranine B, Rosaniline, Indurine Sprit Soluble, Aniline Black, Para-Rosaniline, Methyl Violet, Methyl orange, Methyl Red, Indigo, carbazole, Methylene Blue, o-phenanthroline, p-phenanthroline, 3,6-diaminoacridine, Indanthrene Scarlet 2G, 4-aminodiphenyl-amine, Acridine Yellow, 3-aminophenothiazine, N'-diphenyl-p-phenylenediamine, Rhodamine, 7-amino-4- methylcoumarine, 2-aminophenazine, phenothiazine, diphenylamine, N-methyldiphenylamine, N-phenyltolylamine, ditolylamine, 2-hydroxy-4-methylquinoline, Hansa Yellow G, N,N'-diphenylformamidine, phenanthrophenazine, Bismarck Brown G, 2,3-diaminophenazine, 2-aminodiphenylamine, Chrysodine R, 2,3,7,8-tetraaminophenazine, aminophenoxazone, hydroxyphenoxazone, triphenedioxazine, 2,4-dinitrophenoxazinen and 2',4'-dinitro-4-hydroxy-3-amino-phenylamine;

nitro and nitroso derivatives, such as p-nitrosodiphenylhydroxylamine, phenazine, phenazine oxide, 1-phenylazo-2-naphthol, triphenedioxadine, 4-nitroxanthone and 4'-nitroso-2-nitrodiphenylamine;

phenylhydroxylamine derivatives, such as 4,4'-dinitrodiphenylamine, oxalic acid bis(β-phenylhydrazine), maloic acid bis(β-phenylhydrazine), succinic acid bis(β-phenylhydrazine) and phthalic acid bis(β-Phenylhydrazine);

aromatic halides, such as biphenyl chloride:

aromatic aldehydes, such as 2-phenyl-1-benzyl-benzimidazole, Leucomalachite green, Malachite Green, tetrachlorohydroquinone monobenzoate, benzoflavin, 2-phenylbenzthiazole, 4-benzhydrylbenzaldehyde and bisphenylhydrazone, bis(4-nitrophenylhydrazone);

aromatic ketones such as triphenylisooxazole, benzophenone potassium, 4-methylbenzophenone, p-toluyl acid anilide, benzoic acid toluidide, duryl phenyl keton, 2,4,2',4'-tetramethylbenzophenone and calchonphenylhydrazone, 1,3,5-triphenylpyrazoline, dinitrobenzyl:

benzoic acids, phthalic acids and derivatives thereof, such as quinizaline and nitrodiphenylether;

benzene derivatives having further one substituent other than aldehyde group, such as disalicyaldehyde, coumarine, 2-benzoylcoumarone, 1-hydroxy-2,4-dimethylfluorone, 3-phenylcoumarone, ethyl coumarine-3-carboxylate, 3-acetylcoumarine, hydrovaniloin, 4-hydroxy-3-methoxy-ω-nitrostyrene, α-(nitrophenyl)-β-benzoylethyleneoxide, dinitrophenylindazole, 5-chloro-3-(4-hydroxyphenyl) anthranyl, 3-nitroacridone, 6-nitro-3-phenylanthranyl, 2,8-dimethyl-1,9-anthrazoline, carbostyril, 1,3-dihydroxyacridine, hydroxyquinacdine, Phlorchinyl, 2-methylquinazoline, 3-acetyl-2-methylquinoline, 2-hydroxy-3-phenylquinoline, 3-nitroquinoline and quinoline-2,3-dicarboxylic acid ester;

benzene derivatives having further one substituent other than acyl group, such as 7-hydroxyflavanone, 7-hydroxyflavone, 7,8-dihydroxyflavone, 7-acetoxy-4-methyl-3-phenylcoumarine, 7,8-diacetoxy-4-methyl-3-phenylcoumarine, o-hydroxybenzophenone, xanthone, 2-phenylbenzooxazole, m-hydroxybenzophenone, p-hydroxybenzophenone, 2-benzoylxanthone, 2,4-dihydroxybenzophenone, 2,5-dihydroxybenzophenone, 2,2'-dihydroxybenzophenone, xanthene, aurin, trihydroxybenzophenone, 6,7-dimethoxy-3-phenylcoumarone, o-nitrobenzophenone, m-nitrobenzophenone, 4,4'-dibenzoylazoxybenzene, 2-(2-aminophenyl)-4-methylquinone, 2-hydroxy-4-methylquinone, acridone, 2,4-dimethylquinazoline, 3-cyan-2-hydroxy-4-methylquinoline, flourene, anhydro(2-aminobenzophenone) dimer, 2-hydroxy-3-phenylindazole, 3-phenylindazole, 2-phenylbenzimidazole, 2-methyl-8-benzoylquinoline, 2-methyl-4-phenylquinoline, 4-phenyl-2-quinazolone, aminobenzophenone, chlorobenzophenone, 4-phenylbenzo-1,2,3-triazine-3-oxide, diaminobenzophenone, 7-methyl-3-phenyl-4,5-benzo-1,2,6-oxydiazine, 4,4'-bisdimethylaminobenzophenone, 4,4'-bisdimethylaminobenzophenoneimide, 2,4-dinitro-9-phenyl-acridine and 4,4'-dibenzoyldiphenyl;

Benzene or toluene derivatives having three or more different substituents, such as tetramethoxyindigo, 5,6,5',6'-bis-methylenedioxyindigo, 7-acetoxy-8-methoxy-3-(2-nitrophenyl)carbostyril, 2,2'-dinitrodiphenyldisulfide-4,4'-dialdehyde, 6-chloro-3-benzoylflavone and 1,3,8-trinitrophenoxazine;

aralkyl compounds, such as 9-benzylacridine;

diazo compounds and azo compounds, such as azobenzene, azotoluene, 2,2-dimethoxyazobenzene, 4,4'-dichloroazobenzene, 1,1'-azonaphthalene, 2,2'-dihydroxyazobenzene, 2,2'-dihydroxy-5,5'-dimethylazobenzene, p-bromoazobenzene, p-nitroazobenzene and phenoazoxide;

aromatic unsaturated compounds, such as 2,3,4,5-tetraphenylcyclopentane-2-ene-1-one, 1,2,3-triphenylazulene, 2,2'-dimethyldiphenylacetylene, 4,4'-diethyldiphenylacethylene, 3,4,3',4'-tetramethyldiphenylacetylene, 2,2'-dichlorodiphenylacetylene, 2,2'-dibromodiphenylacetylene, 2-nitrodiphenylacetylene, 2,2'-dinitrodiphenylacetylene, 2,2'-diaminodiphenylacetylene, 2,2'-dimethoxydiphenylacetylene, stilbene, α-methylstilbene, α-ethylstilbene, α,β-dimethylstilbene, α,β-diethylstilbene, α,β-dichlorostilbene, α,β-dibromostilbene, 2-chlorostilbene, 4,4'-diiodostilbene, α-nitrostilbene, α,β-dinitrostilbene, 2,4,6-trinitrostilbene, 2-aminostilbene, 2,2'-diaminostilbene, 4,4'-di(dimethylamino)-stilbene, 2,2'-dicyanostilbene, 2-hydroxystilbene, 2-methoxystilbene, 2,2'-dihydroxystilbene, 2,2'-dimethoxystilbene, 4,4'-dialkoxystilbene and 3,5,2',4'-tetrahydroxystilbene; and polyphenyls and derivatives thereof, such as biphenyl, terphenyl, quaterphenyl, quinquiphenyl, sexiphenyl, septiphenyl, octiphenyl, noviphenyl and deciphenyl.

With respect to the naphthalene derivatives, the following are examples thereof:

alkyl, alkenyl and phenylnaphthalenes, such as 1-methylnaphthalene, 2-methylnaphthalene, 1-ethylnaphthalene, 2-ethylnaphthalene, 1,2-dimethylnaphthalene, 1,4-dimethylnaphthalene, 1,5-dimethylnaphthalene, 1,6-dimethylnaphthalene, 1,7-dimethylnaphthalene, 2,3-dimethylnaphthalene, 2,6-dimethylnaphthalene, 2,7-dimethylnaphthalene, 1-propylnaphthalene, 1-isopropylnaphthalene, 2-isopropylnaphthalene, trimetylnaphthalene, diisopropylnaphthalene, 1-vinylnaphthalene, 2-vinylnaphthalene, 1-propenylnaphthalene, 1-allylnaphthalene, 1-isopropenylnaphthalene, 2-isopropylnaphthalene, 2-isopropenylnaphthalene, 1-phenylnaphthalene, 2-phenylnaphthalene, 1,4-diphenylnaphthalene and 1,2,4-triphenylnaphthalene;

dinaphthyls, such as 1,1'-dinaphthyl, 1,2'-dinaphthyl and 2,2'-dinaphthyl;

naphthylarylmethanes, such as 1-benzylnaphthalene, 2-benzylnaphthalene, 1-(α-chlorobenzyl)naphthalene, 1-(α, α-dichlorobenzyl)naphthalene, diphenyl-α-naphthylmethane, diphenly-β-naphthylmethane, 1,8-dibenzylnaphthalene, di-α-naphthylmethane, α-naphthyl-β-naphthylmethane, di-β-naphthylmethane;

naphthylarylethanes, such as 1-phenethylnaphthalene, 1,2-di-α-naphthylethane, 1,2-di-β-naphthylethane and 1,1-α-dinaphthylethane;

hydronaphthalenes, such as 1,2-dihydronaphthalene, 1,4-dihydronaphthalene and 1,2,3,4-tetrahydronaphthalene;

nitronaphthalenes and derivatives thereof, such as dinaphthopyridazine, 7,8-benzoquinone, 5,6-benzoquinone, naphthazarine, diperimidine, nitromethylnaphthalene, nitroalkylnaphthalene, nitrophenylnaphthalene, halo-nitronaphthalene, halo-dinitronaphthalene, nitrosonaphthalene, dinitrotetraline, dibenzophenazine, methylbenzoindole, 9-chloro-1-azaanthracene, quinolinoquinoline, 1,2,3-triaza-phenarene, perimidone, perimidine, dibenzoacridine, benzophenazine=12-oxide, doaminonaphthalene, triaminonaphthalene, tetraaminonaphthalene, N-ethyl-α-naphthylamine, N-methylnaphthylaminie, N,N-dimethylnaphthylamine, N-methyl-N-ethylnaphthylamine, trimethylnaphthylamine ammonium salt, N-phenylnaphthylamine, N-benzylnaphthylamine, N-naphthylethylenediamine, N-naphthylglycine, N-β-cyanomethylnaphthylamine, N-acetylnaphthylamine, N-formylnaphthylamine, N-benzoylnaphthylamine, N-phthaloylnaphthylamine, aminomethylnaphthalene, nitronaphthylamine, dinitronaphthylamine, halonitronaphthylamine, aminotetraline and diaminotetraline;

halogenated naphthalenes, such as 1-fluoronaphthalene, 1-chloronaphthalene, 1-chloro-3,4-dihydronaphthalene, 1-iodonaphthalene, 1-bromonaphthalene, 1-chloro-4-chloromethylnaphthalene, 1-bromo-2-bromomethylnaphthalene, 1,4-difluoronaphthalene, 1,2-dichloronaphthalene, 1,7-dichloronaphthalene, 1,5-dichloronaphthalene, 1,8-dichloronaphthalene, 2,3-dichloronaphthalene, 1,4-dibromonaphthalene, 1,7-diiodonaphthalene, perylene, 1,2,3-trichloronaphthalene, 1,2,4-tribromonaphthalene, 1,2,3,4-tetrachloronaphthalene, 1,4,5-tribromo-3,8-dimethylnaphthalene, 1,3,6,7-tetrachloronaphthalene, 1,3,5,8-tetrabromonaphthalene and 1,2,3,4,5-pentachloronaphthalene;

naphthylhydroxylamines, naphthylpyrazines and naphthylureas, such as α-naphthylhydroxylamine, N'-phenyl-N-α-naphthyl-N-oxyurea, β-naphthylthiohydroxylamine, N-nitroso-α-naphthylhydroxylamine, Neocupferron, 2-hydroxy-1,1'-azonaphthalene, α-Naphthylhydrazine, 1,2-dibenzocarbazole, 4,4-diamino-1,1'-binaphthyl, 3,4-benzocarbazole, 2,2'-diamino-1,1'-binaphthyl, N'-acetyl-N-β-naphthylhydrazine, N'-lauroyl-N-β-naphthylhydrazine, N'-phenyl-N-α-naphthylhydrazine, n'-(2,4-dinitrophenyl)-N-α-naphthylhydrazine, 2-α-naphthyl-5-nitrobenztriazole, N,N'-di-α-naphthylhydrazine, 1,1'-diamino-2,2'-binaphthyl, N,N'-di-5-tetralylhydrazine, N'-(2,4-dinitrophenyl)-N-β-naphthylhydrazine, 2-β-naphthyl-5-nitro-benztriazole, N'-triphenylmethyl-N-β-naphthylhydrazine, N,N'-di-β-naphthylhydrazine, N-methyl-N-(2,4-dinitro-1-naphthyl)-hydrazine, 2-amino-(naphtho-2',1':4,5-thiazole), 1,2:5,6-dibenzophenazine, 2-amino-(naptho-2',1':4,5-thiazole), 2,3-dihydrazinonaphthalene, 2-phenyl-1,3-bisbenzylidenamino(naphtho-2',3':4,5-imidazoline), N-acetyl-α-naphthylnitrosoamine, N-ethyl-α-naphthylnitrosoamine, N-phenyl-α-naphthylnitrosoamine, α,α'-dinaphthylnitrosoamine, succinic acid bis(β-naphthylnitrosoamide), N-ethyl-β-naphthylnitrosoamine, N-phenyl-α-naphthylnitrosoamine, N-acetyl-2-methyl-1-naphthylnitrosoamine, 4,5-benzindazole, naphthylnitrosoamine, 1-nitro-2-naphthylamine, α-naphthylurea, N,N'-di-α-naphthylurea, 4-chloro-1-naphthylcarbamoylchloride, 2,4-dichloro[naptho-1',2':4,5-thiazole], 2-mercapto[naphtho-1'1,2':4,5-thiazole], 2-chloro[naptho-1',2';4,5-thiazole], 2-mercapto[naptho-2',1':4,5-thiazole] and 2-chloro [naptho-2',1':4,5-thiazole];

naphthalene type aralkyl compounds, such as dibenzoanthracene, acenaphthene, α-chloroethylnaphthalene, phenylnaphthylchloromethane, diphenylnaphthylchloromethane, nitromethylnaphthalene, aminomethylnaphthalene, (naphthylmethyl)amine, α-phenyl(naphthylmethyl)amine, N-benzyl-(naphthylmethyl)amine, trimethyl (naphthylmethyl)ammonium salt, tri(naphthylmethyl)amine, di(naphthylmethyl)amine, (β-naphthylethyl) alcohol, dimethylnaphthylcarbinol, phenylnaphthylcarbinol, diphenylnaphthylcarbinol, 9-phenylbenzofluorene, naphthylpropyleneoxide, ethyl (naphthylmethyl)ether, phenyl(naptylmethyl)ether, naphthylacetone, ω-naphthylacetophenone, acenaphthenone, dihydrophenarone, phenarone, benzoindanone, naphthylacetonitrile, 9,9'-dichlorodibenzofluorene, α-nitro-β-naphthylethylene, γ-naphthylallyl alcohol,β-naphthylacrolein, methyl (β-Naphthylvinyl) ketone and naphthylphenanthrene dicarboxylic acid anhydride;

Naphthols and naphthalenesulfonic acids, such as 9-hydroxynaphthacenequinone, 2'-naphthalene-2-indoleindigo, 1-methoxynaphthalene, 1-ethoxynaphthalene, 1-phenoxynaphthalene, α-naptholsalicylic acid ester, β-naphthol, α-naphthol, α-naphtholbenzoic acid ester, α-naphtholacetic acid ester, phenyl-β-hydroxynaphthylbenzaliminomethane, β-naphtholphenylmethylamine, methylene-di-β-naphthol, dinapthopyrane, 1'-naphthol-2-indoleindigo, 2-methoxynaphthalene, 2-ethoxynaphthalene, N-p-hydroxyphenyl-2-naphthylamine base, β-naphthosalicylic acid ester, 2-methyl-1-naphthol, 1,2-napthamethylenequinone, 1,2-dihydroxynaphthalene, naphthaleneindoleindigo, α,β-naphthophenoxazine, β,γ-naphthophenoxazine, 4-hydroxy-10-methyl-1',2'-benzocarbazole, dihydroxynapthofluorane, dinaphthoquinone, 2,6-naphthoquinone, hydroxybenzoacridine, 9-hydroxy-3-dimethylaminonaphthophenoxazine, 1,2,4-trihydroxynapthalene, 1,4,5,6-tetrahydroxynaphthalene, thio-α-naphthol, 4-mercapto-1-naphthol, 1,5-naphthalenedithiol, methyl-α-naphthyl sulfide, 1,1'-naphthyl sulfide, 1,1'-thiodi-2-napthol, 1,1'-naphthyl disulfide, 1,1'-thiodi-1-naphthol, thio-β-Naphthol, naphthothioindigo, 1-amino-2-naphthalenethiol, naphthothianthrene and 2-mercapto-1,2-napthothiazole;

napthoaldehydes and derivatives thereof, such as α-naptholaldehyde, 2-(2,4-dinitrophenyl)-1-(αnaphthyl)ethylene, 2-methyl-1-naphthoaldehyde, 2,3-dimethyl-1-naphthoaldehyde, 4-bromo-1-naphthoaldehyde, 4-nitro-1-naphthoaldehyde, 2,4-dinitro-1-naphthoaldehyde, 4-amino-1-naphthoaldehyde, 2-hydroxy-1-naphthoaldehyde, 1-naphthalene-2'-indoleindigo, 1,2-bis(2-hydroxy-1-naphthyl)ethylene, 1,2:7,8-dibenzoxanthilium chloride, 2-hydroxy-1-naphthylethynyl pyrylium salt, 5,6-benzocoumarin, bis(2-methyl-3-indolyl)(2-hydroxy-1-naphthyl)methane, 4,5-benz-indoxazene, 2-acetoxy-1-naphthonitrile, 4-methoxy-1-naphthoaldehyde, 1,4-bis(4-methoxy-1-naphthyl)-1,3-butadiene, 2-naphthalene-2'-indoleindigo, 3-acetyl-6,7-benzocoumarin, 4-chloro-1-hydroxy-2-naphthoaldehyde, haphthalenedialdehyde, 5-hydroxy-2-naphthaleneindoleindigo, 5,6,7,8-tetrahydro-2-naphthoaldehyde, imide chloride, naphthoamide, naphthoanilide, naphthonitrile, ethyl β-naphthoimidate, β-naphthamidine, α-naphthoamidoxime, α-naphthohydrazide, naphthostyryl, hydroxynaphthonitrile, 1,2:7,8-dibenzoxanthone, 1,2-benzoxantjone, 1,1'-binaphthylene-2,8:8,2'-dioxide, 2,3:6,7-dibenzoxanthone, 3-hydroxy-2-naphthoanilide, 1,3-bis(3-hydroxy-2-naphthoyloxy)benzene, 2,4-dihydroxyphenyl-3-hydroxy- 2-naphthyl ketone, 4-arylazo-3-hydroxy-2-naphthoanilide, 3,4-dihydronaphthalene-1,2-dicarboxylic acid anhydride, 2-aminonaphthalimide, naphthalohydrazide, α-pyridonaphthalone and N-methylnaphthalimide; and acetonaphthenes, benzoylnaphthenes, such as 1,2:5,6-dibenzanthracene, 2'-methyl-2,1'-dinaphthyl ketone, 2-methyl-1,1'-dinaphthyl ketone, styryl-2-naphthyl ketone, β-naphthoyl acetone, β-naphthoyl acetophenone, 1-(β-naphthyl)-1-chloroethylene, 2-[tris(β-cyanoethyl)acetyl]naphthalene, 1,3,5-tri(β-naphthyl)benzene, dimethyl-2-naphthylcarbinol, 4,5:4',5'-dibenzothioindigo, styryl-1-naphthyl ketone, β-acetonaphthone, 1-propionylnaphthalene, 1-butylnaphthalene, 1-isobutylnaphthalene, 1-stearoylnaphthalene, 1-benzoyl-naphthalene, 1-o-toluylnaphthalene, p-biphenyl-1-naphthyl ketone, 1,2,5,6-dibenzanthracene, 1-acetyl-3,4-dihydronaphthalene, 1-acetyl-7-bromonaphthalene, 1-aminoacetylnaphthalene, 2-aminobenzoylnaphthalene, 1-acetyl-2-hydroxynaphthalene, 1-acetyl-2-methoxynaphthalene, 1-acetyl-4-ethoxynaphthalene, 2-cinnamoyl-1-naphthol, 7,8-benzochromone, 3-acetyl-2-methyl-7,8-benzochromone, 3-acetyl-2-methyl-7,8-benzochromone, 3,4-dimethyl-7,8-benzocoumarine, 4-methyl-3-phenyl-7,8-benzocoumarine, 1-benzoyl-2-hydroxynaphthalene, 4-hydroxybenzanthrone, 4-benzoyl-1-naphthol, 3-hydroxy-1,2-benzofluorenone, 2-acetyl-4-chloro-1-hydroxynaphthalene, α-naphthylglyoxal, β-naphthylglyoxal, 1,4-dibenzoylnaphthalene and phenyl-4-methyl-1-naphthydiketone.

With respect to the polynuclear aromatic compounds, the following are examples thereof:

anthracenes and derivatives thereof, such as anthracene, 1,2-dihydroanthracene, 1-chloroanthracene, 1,4-dichloroanthracene, 1,2,7-trichloroanthracene, 1,2,3,4-tetrachloroanthracene, 1-nitroanthracene, 9,10-dinitroanthracene, 1-aminoanthracene, 2-dimethylaminoanthracene, 2-anilinoanthracene, 9-methylaminoanthracene, 1,4-diaminoanthracene, 1-hydroxyanthracene, 9,10-dihydroanthrol, 10-methylanthranol, 10-phenylanthranol, 10-nitroanthranol, 2-amino-1-anthranole, 1,2-dihydroxyanthracene, 9,10-dihydroxyanthracene diacetate, 1-methylanthracene, 4-chloro-1-methylanthracene, 1,5-dichloro-2-methylanthracene, 9-ethylanthracene, 9-vinylanthracene, 9-propylanthracene, 9-isopropylanthracene, 9-butylanthracene, 9-isobutylanthracene, 9-isoamylanthracene, 1,3-dimethylanthracene, 9,10-diethylanthracene, 1-phenylanthracene, 9-phenylanthracene, 1,5-dichloro-9-phenylanthracene, 10-nitro-9-phenylanthracene, 9-benzylanthracene, 1-benzhydrylanthracene, 9, 10-diphenylanthracene, 9,10-dibenzylanthracene, 9,10-diphenyl-9,10-dihydroanthracene, 1-(β-naphthyl)anthracene, 9-(α-naphthyl)-10-phenylanthracene, 9,10-di(α-naphthyl)anthracene, 1,1'-bianthryl, 2,2'-bianthryl, 9,9'-bianthryl, anthracene-9-aldehyde, 1-acetylanthracene, 9-benzoylanthracene, 10-nitroanthraphenone, 9,10-dibenzoylanthracene, anthrone, 9-mercaptoanthracene, 9,10-disodium-9,10-dihydroanthracene, 10-bromo-9-anthrylmagnesium bromide and anthrylmercury chloride;

phenanthrenes and derivatives thereof, such as phenanthrene, 9,10-dihydrophenanthrene, 1,2,3,4-tetrahydrophenanthrene, 1-chlorophenanthrene, phenanthrene-9,10-dichloride, 1-bromophenanthrene, 1-iodophenanthrene, 9-(chloromethyl)phenanthrene, 1-(bromomethyl)phenanthrene, 4,5-bis(bromomethyl)phenanthrene, 1-nitrophenanthrene, 10-bromo-9-nitrophenanthrene, 1-aminophenanthrene, 9,10-diaminophenanthrene, 9,9'-azoxyphenanthrene, 9,9'-azophenanthrene, 1-hydroxyphenanthrene, cholesterol, estrone, androsterone, 10-bromo-9-phenanthrol, 9-nitro-3-phenanthrol, 4-amino-1-phenanthrol, 10-benzoazo-9-phenanthrol, 1,2-dihydroxyphenanthrene, retene-3,8-diol, 2,3,5,6-tetrahydroxyphenanthrene, 1-methylphenanthrene, 1-ethylphenanthrene, 1-vinylphenanthrene, 1,2-dimethylphenanthrene, 9,10-diethylphenanthrene, 9,10-dipropylphenanthrene, 2-ethyl-1-methylphenanthrene, 7-isopropyl-1-methylphenanthrene, 9,10-dihydroretene, aminoretene, 3-acetoaminoretene, 6-acylaminoretene, 9-phenylphenanthrene, 9-benzylphenanthrene, 1-(α-naphthyl)phenanthrene, 1,1'-bi-phenanthryl, 9,9'-biphenanthryl, 1-phenanthraldehyde, 2-phenanthraldehyde, 9-phenanthraldehyde, 1-acetylphenanthrene, 2-propionylphenanthrene, 3-acetylretene and 1-benzoylphenanthrene;

phenanthrenequinones, such as phenanthrene-1,2-quinone, phenanthrene-1,4-quinone, phenanthrene-3,4-quinone, phenanthrene-9,10-quinone, 2-phenyl-3-acetoxy-4,5-biphenylfuran, 7-isopropyl-1-methylphenanthrenequinone, 1-chlorophenanthrenequinone, 2-bromophenanthrenequinone, 2-iodophenanthrenequinone, 2,7-dibromophenanthrenequinone, 2-nitrophenanthrenequinone, 2,5-dinitrophenanthrenequinone, 2-aminophenanthrenequinone, 2,7-diaminophenanthrenequinone, 3,6-diaminophenanthrenequinone, 2,5- diaminophenanthrenequinone, 2-hydroxyphenanthrene-1,4-quinone, 3-hydroxyphenanthrenequinone, 2-hydroxyretenequinone, 3-hydroxyretenequinone, 6-hydroxyretenequinone, 2-hydroxy-3,4-dinitrophenanthrenequinone and 2-amino-3-hydroxyphenanthrenequinone; and other polynuclear aromatic compounds and derivatives thereof, such as pentacene, hexacene, benzophenanthrene, benzo[a]anthracene, naptho[2,1,a]pyrene, dibenzo[a,j]-anthracene, pyrene, coronene, 1,12-benzoperylene, overene, dibenzoanthracene, naphthacene, Terramycin, Auremycin, rubrene, o-toluoyl-1-naphthalene, benzoanthraquinone, 5,6-dihydroxy-5,6-dihydrobenzoanthracene, chrysene, triphenylene, dibenzonaphthacene, hexahydropyrene, perylene, 3,9-dichloro-perylene, tetrachloroperylene, 3,9-dibromoperylene, 3,10-dinitroperylene, 4,6-dibenzoyl-1,3-dimethylbenzene, 6,13-dihydropentacene, naptho[2,3-a]anthracene, dispirane, dibenzo-[a,h]anthracene, picene, picyleneketone, picene-5,6-quinone, dibenzo[c,g]phenanthrene, benzo[a]pyrene, benzo[a]pyrene-1,6-quinone, mesobenzoanthrone pericarboxylic acid anhydride, anthraceno[2,1-a]anthracene, dibenzo[a,1]naphthacene, phenanthrene[2,3-a]anthracene, naphtho[2,3-a]pyrene, dibenzo-[a,h]pyrene, dibenzo[a,1]pyrene, zethrene, anthanthrene, benzo[1,12]perylene, heptacene, tetrabenzo[a,c,h,j]anthracene, tribenzo[a,I,1]pyrene, tetrahydrodimethyldinaphthyl, mesonaphthodianthrene, mesoanthrodianthrene and 2,3:8,9-dibenzocoronene, pyranthrene.

With respect to the quinones and their derivatives, the following are examples thereof:

benzoquinones and derivatives thereof, such as dibenzoquinoyl disulfide, 2,5-bis(phenylthio)-p-benzoquinone, bibenzoquinone, bitoluquinone, phoenicin, Oosporein, indophenol, indoaniline, Hydron Blue, indamine, Meldra's Blue, Wurster's Blue, Wurster's Red, 4,4'-diphenoquinone, 4,4'-stilbenequinone, 3,5,3',5'-tetramethyl-4,4'-diphenoquinone, 3,5,3',5'-tetra-tert-butyl-4,4'-diphenoquinone, 3,5,3',5'-tetramethyl-4,4'-stilbenequinone and 3,5,3',5'-tetra-tert-butyl-4,4'-stilbenequinone;

naphthoquinones and derivatives thereof, such as 1,2-naphthoquinone, 3-hydroxy-2,2'-binaphthyl-1,4:3',4'-diquinone, 5,6-benzoquinoxaline, 1,2-benzophenazine, 2-benzoazo-1-naphthol, 4-(2,4-dihydroxyphenyl)-1,2-dihydroxynaphthalene, 4-(3,4,5-trihydroxyphenyl)-1,2-dihydroxynaphthalene, 1,2-naphthoquinone-1-phenylimide, 1,2-benzophenoxazine, 1,2-naphthoquinone-2-chloroimide, 1,2-napthoquinone-bischloroimide, 2-anilino-1,4-naphthoquinone-4-anil, 2-hydroxy-1,4-naphthoquinone-4-anil, 1,2-naphthoquinone-1-oxime benzoate, 1,2-naphthoquinone-1-oxime methyl ether, 1-nitroso-2-naphthol, 2-nitroso-1-naphthol, naptho[1',2':3,4]furazane, 1,2-naphthoquinone-2-oxime benzoate, 1,2-naphthoquinone-2-oxime methyl ether, 3-anilino-1,2:8,9-dibenzophenazine, Naphthyl Blue, Naphthyl Violet, 1,2:5,6-dibenzophenazine, naptho[1',2':3,4]furazane-2-oxide, triphthaloylbenzene, hexahydroxynaphthalene anhydride, 2,2'-binaphthyl- 1,4:1',4'-diquinone, 1',4'-dihydroxynaphtho-(2',3':3,4)pyrazole, 4,7-dihydroxy-3,3-diphenyl-5,6-benzindiazene, 2-diphenylmethyl-1, 4-naphthoquinone, methylnaphtho-[2',3':4,5]triazole-1',4'-quinone, 1,2,4-triacetoxynaphthalene, 1,4-naphthoquinonephenylimide, 1,4-naphthoquinonemono-(p-dimethylaminoanil), 1,4-naphthoquinonealkylimide, 4-nitroso-1-naphthol, phenylcarbamate, 4-nitroso-1-naphthyl-amine, 4-benzhydryl-1,2-naphthoquinone, 2-benzhydryl-1,4-naphthoquinone, 3-benzhydryl-2-methyl-1,4-naphthoquinone, 3-geranyl-2-methyl-1,4-naphthoquinone, 3-farnesyl-2-methyl-1,4-naphthoquinone, 2-methyl-3-phytyl-1,4-naphthoquinone, Vitamine K1, Vitamine K2, 3-allyl-2,6-dimethyl-1,4-naphthoquinone, 2,6-dimethyl-3-phytyl-1,4-naphthoquinone, 2,3-diallyl-6,7-di-methyl-1,4-naphthoquinone, 2-phenyl-1,4-naphthoquinone, 2-methyl-1,4-naphthoquinone, 2,6-dimethyl-3-phenyl-1,4-naphthoquinone, 3-benzyl-2-methyl-1,4-naphthoquinone, 2-methyl-3-(β-phenylethyl)-1,4-naphthoquinone, 3-cinnamyl-2-methyl-1,4-naphthoquinone, 2-benzhydryl-1,4-naphthoquinone, 4,7-diketo-8-diphenylmethyl-4,7,8,9-tetrahydro-5,6-benzindiazene, 2-methyl-3-diphenylmethyl-1,4-naphthoquinone, 2,3-diphenyl-1-naphthol, naphtho[2',3':3,4]-pyrazole-1',4'-quinone, 3,4-dichloro-1,2-benzophenazine, 2-iodo-1,4-naphthoquinone, 1,4,5,8-ntetrahydroxy-2,3:6,7-dibenzothianthrene, 5,8-dihydroxy-2,3:6,7-dibenzo-thianthrene-1,4-quinone, 2,3-diphenoxy-1,4-naphthoquinone, dinaphtho[2',3':2,3][1",2":5,4]furan-1',4'-quinone, 2,3,5,8-tetrachloro-1,4-naphthoquinone, N,N'-bis-(1,4-naphthoquinone-2-yl)benzidine, 2-anilino- 1,4-naphthoquinone-4-anil, 4-anilino-1,2-naphthoquinone-2-anil, phenylrosindarine, 2-anilino-1,4-naphthoquinone-(p-dimethylaminoanil), 2-anilino-1,4-naphthoquinonedianil,2-anilino-3-phenyl-1,4-naphthoquinone, 2-anilino-3-bromo-1,4-naphthoquinone, 2-anilino-4-chloro-1,4-naphthoquinone, 2,3-dianilino-1,4-naphthoquinone, 2,3-dianilino-1,4-naphthoquinonedianil, nitrosoaminonaphtho-quinone, 3-chloro-2-phenylnitrosoamino-1,4-naphthoquinone, phenyl-bis-(3-anilino-1,4-naphthoquinone-2-yl)-amine, 3-chloro-2-(p-tolylnitrosoamino)-1,4-naphthoquinone, 2,7-dihydroxy-1-nitrosonaphthalene, 4-benzeneazo-1,3-dihydroxynaphthalene, di-(3-hydroxy-1,4-naphthoquinonyl-2-)methane, anhydroalkannin, diquinoxalino-[2',3':1,2:2",3":3,4]naphthalene and 3,4-phthaloylfurazane; and anthraquinones and derivatives thereof, such as 1,2-anthraquinone, 2,3-anthraquinone, 1,4-anthraquinone, 9,10-anthraquinone, 1,5-anthraquinone, 2,6-anthraquinone, 1,10-anthraquinone, 9,9-bis(p-hydroxyphenyl)anthrone, anthraquinone bisdiphenylmethide, bisphenylhydrazone, benzanthrone, anthrahydroquinone, β-ethylanthraquinone, 1,3,5,7-tetramethylanthraquinone, 2,2'-dianthraquinonylethane, 2,2'-dianthraquinonylethylene, 1,2,3-trihydroxyanthraquinone, anthrachrysone, erythrooxyanthraquinone, alizarin, quinizarin, anthrarufin, chrysazin, hystazarin, anthraflavin, isoanthraflavin, anthragallol, purprin, oxyanthrarufin, anthrapurprin, oxychrysazin, oxyflavopurprin, Rufiopin, quinalizarin, alizarinpentacyanine, rufigallol, Anthracene Blue WR, alizarinhexacyanine, 2-chloroquinizarin, 1-nitroanthraquinone, purpurin, 2,4,6,8-tetrabromoanthrachrysone, 3-aminoanthrapurpurin, 1,8-dinitroanthraquinone, α-aminoanthraquinone, 1,1'-dianthraquinonyl, dianthraquinoneimide, 1,4-dimethylaminoanthraquinone, 5-amino-1-nitro-6,8-dibromoanthraquinone, 1,5-tetramethyldiamino-4,8-dinitroanthraquinone, anthra-quinoneacridone, bis-N-(2-hydroxyanthraquinolyl)-p-phenylenediamine, leucoquinizarin, Quinizarin green, 1-amino-2,4-dibromoanthraquinone, 1,4-diacylaminoanthraquinone, anthra-quinone-β-aldehyde, o-diazine, 6,7-phthaloyl-1,9-benzanthrone, oxynitrosoanthraquinone, 1,1'-dianthraquinolyl, azoxyanthraquinone, 8-chloropyrazolanthrone, 2,6-dihydrazinoanthraquinone, anthraquinone diazonium salt, β-anthraquinone-hydrazine, azoxyanthraquinone, pyrazoleanthrone, 1-(anthraquin-2-yl)-3-methylpyrazolone, 1-hydroxylamino-anthraquinone, 1,5-dihydroxylaminoanthraquinone, 1-nitrosoanthraquinone, 1-hydrazinoanthraquinone, 1,5-dihydrazinoanthraquinone, 1-azidoanthraquinone, 2-azidoanthraquinone, anthraquinonemethylsulfoxide, 1,4-dirhodaneanthraquinone, β,β-dianthraquinolyl sulfide, anthraquinonesulphenyl chloride, 2,2'-dianthraquinonyl, 1,1'-dianthraquinonyl, helianthrone, mesobenzodianthrone, 2,2'-diamino-1,1'-dianthraquinolyl, flavanthrone, 2,2'-dicyantolyl, mesonaphthodianthrone, 1,1'-dianthraquinolylamine, quinizarinquinone, hystazarinquinone, alizarinquinone and 6-hydroxyquinizarinquinone.

With respect to the non-benzene type aromatic ompounds, the following are examples thereof:

azulene, cyclodecapentane, cyclodecaheptan, yclooctadecanonaene, cyclotetracosadodecaene, heptalen, fulvalene, sesqui-fulvalene, heptatulvalen, perinaphthene, indeno[2,1-a]peri-naphthene, dibenzo[bf]oxepine, dibenzo-[bf]thiepine, indolizine, cyclo[3,2,2]azine, 4,5-benzotropolone, 3,4-benzotropolone, 5H-benzocycloheptene, 7H-benzocycloheptene, colchicine, colchicein, colchinol methyl ether, ditropyl ether, ditropyl sulfide, cyclopentadienyltropylidene, benzoazulene, carbinol, 4,5-benzotropone, 2-phenyltropone, naphthocycloheptadienone, naphthotropone, tribenzotropone, 1-amino-1,3-dicyanoazulene, benzoylhydrazone, 3-phenyl-1-hydroxyaazuranone-2,2-benzyltropone, 3-methyl-2-phenyltropone, 2,7-diphenyltropone, 2-(α-naphthyl)tropone, 2,7-tetramethylene-4,5-benzotropone, 2,7-diphenyl-4,5-benzotropone, naptho[2',3'-4,5]tropone, naphtho[2',1'-2,3]tropone, dibenzosuberane, naphtho[1',2'-2,3]tropone, dibenzosuberol, 4-hydroxy-2-phenyltropone, 4,5,7-tribromo-2-phenyltropone, 3,5'-ditropone, 3-(p-methoxyphenyl)tropone, 4-hydroxy-2-phenyltropone, 3-(α-naphthyl)tropone, 3,4-diphenyltropone, 3,7-dibenzyltropone, 4-(γ-phenylpropyl)tropone, 3,5'-bitroponyl, 4-(p-nitrostyryl)tropone methyl ether, 2-amino-1,3-dicyanoazurene, benzo[b]tropothiazine, 5-bromo-2-phenyltropone, 4-bromo-2,7-diphenyltropone, diphenylbiphenyl-carbinol and thiazinotropone.

In the next place, specific examples of the heterocyclic compounds having at least 5 conjugated π bonds are enumerated below.

With respect to the oxygen-containing heterocyclic compounds, the following are examples thereof:

furan and derivatives thereof, such as 2,5-diphenylfuran, 2-phenylfuran, 3-methyldiphenylfuran, lepidene, pyridoxine and 2,4-diphenylfuran;

benzofuran, isobenzofuran, dibenzofuran and derivatives thereof, such as dibenzofuran, furano[2',3'-7,8]flavone, egonol, Euparin, 1,3-diphenylisobenzofuran, tetraphenyl glycol, tetraphenylphthalan, 9-phenylanthracene, o-hydroxymethyltriphenylcarbinol, 3,3'-diphenylphthalide, 1-phenylphthalan, 1,1-phenylphthalan, 3,3-diphenylphthalide, rubrene, α-sorinine, 2,2'-dihydroxybiphenyl, 2,2'-diaminobiphenyl, phenazone, dibenzoquinone, 2-hydroxybenzofuran, 2-methylbenzofuran, benzo[a]benzofuran, benzo[b]benzofuran, dibenzo[a,f]dibenzofuran, dibenzo-[c,d]dibenzofuran, dibenzo[c,e]dibenzofuran, bis(2-dibenzofuryl) and bis(3-dibenzofuryl);

pyran and pyrone derivatives, such as 2-p-hydroxyphenyl-4,6-diphenylpyrylium ferrichloride, anhydrobase, benzopyran, 4-p-hydroxyphenyl-2,6-diphenylpyrylium ferrichloride and 6-phenylcoumarin;

chromenol and chromene derivatives, such as 6-methyl-2,3-diphenylchromone, 6-methyl-2,3-diphenyl-4-(p-tolyl)-1,4-benzopyran-4-ol, chromanol, γ-chromene, oxycoumarone, chromene, cyanizine chloride, fisetin, 6-hydroxy-3-methoxy-5,7-dimethylflavirium chloride, 4,4'-diflavilene-3,3'-oxide, chrysinidine, apigenidine, rotoflavinidine, lutesonidine, galanginidine, fisenidine, molinidine, flavoneimine, pelargonidin, cyanidin, delphinidin, petunidin, syringggidin, histidin, apigenidin, carajurin, dracorhodin and dracorubin;

flavone, flavonol and isoflavon derivatives, such as flavonol, flavone and fukugetin;

coumarin and isocoumarin derivatives, such as 7-hydroxy-3,4-benzocoumarin, dicoumarol, angelicin, psoralen, bergapten, bergaptol, xanthoxin, xanthoxal, isopimpinellin, pimpinellin, oroselol, oroselone, peucedanin, oxypeusedanin, ostruthol, medakenine, nodakenetin, seselin, xanthyletin, xanthoxyletin; and xanthone and related compounds, such as dixanthylene, 9-phenylxanthene, isoxanthone, 1,2,7,8-dibenzoxanthene, 3,9-diphenylxanthene and 9,9-diphenylxanthene.

With respect to the nitrogen-containing heterocyclic compounds, the following are examples thereof:

pyrroles, such as 1-phenylpyrrole, 5-phenylpyrrole-2-aldehide, phenyl-2-pyrrylketoneoxime, 2-phenylpyrrole, 2-methyl-1-phenylpyrrole, 2-methyl-4-phenylpyrrole, 2-methyl-5-phenylpyrrole, 3-methyl-5-phenylpyrrole, 2,4-diphenylpyrrole, 2,5-diphenylpyrrole, 2,3-diphenylpyrrole, 2,3,5-triphenylpyrrole, 1,2,3,5-tetraphenylpyrrole, diphenyl-2-pyrrolylcarbinol, pyrrolecyclotrimethyne dye, pyrrolepolymethylene dye, biliverdin, bilirubin, prodigiosin and stercobilin;

indoles, such as 5,7-dichloro-2-phenylindole, 7-chloro-2-phenylindole, 5,7-dibromo-2-phenylindole, 7-bromo-5-chloro-2-phenylindole, 2-(3'-indolyl)-3-isonitrosoindolenine, Roseindole, triptphan Blue, indolo[3,2-c]quinoline, indolo-[1,2-c]quinazoline, 2-phenylindole, 3-nitro-2-phenylindole, 3-phenylindole, N-methyl-3-phenylindole, 3-(o-nitrophenyl)-indole, 2,3-diphenylindole, 3-triphenylmethylindole, 2-methyl-3-triphenylmethylindole, 2-phenyl-3-triphenylmethylindole, 2-(1-naphthyl)triphenylmethylindole, 2-(2-naphthyl)-3-triphenylmethylindole, 3,3'-diindolyl, 3,2'-diindolyl, 3,3'-dehydrodiindole, Roseindole, 3-nitroso-2-phenylindole, 3-nitro-2-phenylindole, 2-methyl-3-phenylazoindole, 2-phenyl-3-phenylazoindole, 6-hydroxy-3-phenylindole, triptophan, 4,5-benzotriptophan, 6,7-benzotriptophan and violasein;

oxo derivatives of indole, such as 3-(4-ethoxy-1-naphthyl)oxyindole, indophenine, indigoazine and Indigo Yellow 3G;

isoindoles, such as 1-chloro-4-methylphthalazine, 1-benzilidenephthalimidine, 2-methyl-3-phenylphthalimidine, 2-methyl-1,3-diphenylisoindole, 2,5-diphenylisoindole, β-isoindigo and dimethylimino-β-Isoindigo;

carbazoles, such as 1-phenyl-1,2,3-benzotriazole, 2,2'-diaminodiphenyl and 1,1'-dicarbazole;

porphyrins, such as porphyrazine, magnesium octamethyltetraazaporphyrin, azadipyromethine, phthalocyanine, diazacoproporphyrin, porphine, mesotetraphenylporphyrin, chlorophyll-b and chlorophyll-a;

oxazoles, such as 2-phenyloxazole, 4-phenyloxazole, 5-phenyloxazole, 2-methyl-4-phenyloxazole, 2-methyl-5-phenyloxazole, 4-methyl-2-phenyloxazole, 5-methyl-2-phenyloxazole, 4,5-dimethyl-2-phenyloxazole, 2,4-diphenyloxazole, 2,5-diphenyloxazole, 4,5-diphenyloxazole, 2-methyl-4,5-diphenyloxazole, 2,4,5-triphenyloxazole, 2-(o-nitrophenyl)oxazole, 2-(p-nitrophenyl)oxazole, 2-amino-5-phenyloxazole, 2-(p-amino-phenyl)oxazole, 2-(o-aminophenyl)oxazole, 4,5-dimethyl-2-phenyloxidooxazole, 4-methyl-2,5-diphenyloxidooxazole, 2,4,5-triphenyloxidooxazole, 4-(o-methoxycarbonylbenzal)-2-phenyl-5-oxazolone, oxacarbocyanine dye and phenanthrooxazole;

isooxazoles, such as 4-nitro-3-phenylisooxazole, 5-amino-3-methyl-4-phenylisooxazole and 5-benzoyl-3,4-diphenylisooxazole;

thiazoles, such as 4-phenylthiazole, 5-phenylthiazole, 5-(p-fluorophenyl)thiazole, 2-methyl-4-phenylthiazole, 4-methyl-5-phenylthiazole, 5-methyl-4-phenylthiazole, 4,5-diphenylthiazole, 2-methyl-4,5-diphenylthiazole, 1,4-bis(4-methyl-2-thiazolyl)benzene, p,p'-bis(4-methyl-2-thiazolyl)-biphenyl, 2-amino-4-phenylthiazole, 2-amino-5-phenylthiazole, 2-amino-4,5-diphenylthiazole, 2-phenylazothiazole, 2-amino-4-methyl-5-phenylazothiazole, 4-methyl-2-phenylazothiazole, α-naphthothiazole, β-naphthothiazole, naphtho[2,3]thiazole, naphtho[1,2]thiazole, 2-methyl[1,2]thiazole, 2-phenylnaphtho-[1,2]thiazole, 2-methylnaphtho[2,1]thiazole, 4-bromo-2-phenylnaphtho[2,3]thiazole, 2-hydroxynaphtho[2,1]thiazole, 2-aminonaphtho[1,2]thiazole, 2-aminonaphtho[2,1]thiazole, 2-mercaptonaphtho[1,2]thiazole and 2-mercaptonaphtho[2,1]thiazole;

imidazoles, such as 2-phenylimidazole, 4-phenylimidazole, 4-methyl-2-phenylimidazole, 2,4-diphenylimidazole, 4,5-diphenylimidazole, 2,4,5-triphenylimidazole, 2-bromo-4-phenylimidazole, 5-chloro-1-ethyl-2-phenylimidazole, 5-chloro-1,2-diphenylimidazole, 2-phenylazoimidazole, 2-methyl-4-phenylazoimidazole and 2-(o-aminophenyl)benzoimidazole;

pyrazoles, such as 3-phenylpyrazole, 5-phenylpyrazole, 4-phenylpyrazole, 1-methyl-3-phenylpyrazole, 1-methyl-5-phenypyrazole, 3-methyl-5-phenylpyrazole, 1,3-diphenylpyrazole, 1,5-diphenylpyrazole, 1,3,4-triphenylpyrazole, 1,3,5-triphenylpyrazole, 1,4,5-triphenylpyrazole, 5-amino-3-phenylpyrazole, 3-amino-5-phenylpyrazole, 5-methyl-1,3-diphenylpyrazole-4-aldehyde, 3,5-diacetyl-4-phenylpyrazole and 4-benzoyl-1,5-diphenylpyrazole;

oxadiazoles, such as 3-phenylfurazane, 3,4-diphenylfurazane, naptho[1,2]furazane, phenylfuroxane, 3-methyl-5-phenyl-1,2,4-oxadiazole and 2,5'-diphenyl-1,3,4-oxadiazole;

thiadiazoles, such as 5-phenyl-1,2,3-thiadiazole, 2-phenyl-1,3,4-thiadiazole, 5,5'-diphenyl-2,2'-bis(1,3,4-thiadiazole), 2-hydroxy-5-phenyl-1,3,4-thiadiazole and 2-methylsulfonyl-5-phenyl-1,3,4-thiadiazole;

triazoles, such as 2-phenyl-1,2,3-triazole and 5-(p-aminophenyl)-3-mercapto-1,2,4-triazole;

tetrazoles, such as 5-phenyltetrazole, 1,5-diphenyltetrazole, 1-hydroxy-5-phenyltetrazole and 1-amino-5-phenyltetrazole;

pyridine related compounds, such as 2-phenylpyridine, 2,2'-dipyridyl, 2-chloro-6-phenylpyridine, 2,6-dichloro-3-phenylpyridine, 2,2'-azopyridine, 3,3'-azopyridine, benzene-4-azopyridine, 5-chloro-2,2'-azopyridine, 5,5'-dichloro-2,2'-azopyridine, 4-pyridylazoresorcin, 4-pyridyl-m-phenylenediamine and 3-pyridyl-m-phenylenediamine;

quinoline and related compounds, such as quinoline, quinaldine, quinaldine-N-oxide, ethylquinoline, 2-phenylquinoline, 3-methylquinoline, 3-phenylquinoline, 4-methylquinoline, 4-phenylquinoline, 6-methylquinoline, 6-ethylquinoline, 6-phenylquinoline, 2,4-dimethylquinoline, 2,4-diphenylquinoline, quinoline-4-methanol, quinoline[6,5-f]-quinoline, quinophthalone, flavaaniline, Quinoline Blue, Ethyl Red, pinacyanol, naphthocyanol, cryptocyanine, xenocyanine, azacyanine, 6,6'-octahydroquinoline, Besthorn's red, 2,3'-biquinoline, 2,5'-biquinoline, 2,6'-biquinoline, 2,7'-biquinoline, 3,3'-biquinoline, 4,5'-biquinoline, 4,6'-biquinoline, 5,5'-biquinoline, 6,6'-biquinoline, 6,7'-biquinoline, 6,8'-biquinoline, 7,7'-biquinoline, 8,8'-biquinoline, 2-fluoroquinoline, 3-fluoroquinoline, 4-fluoroquinoline, 5-fluoroquinoline, 6-fluoroquinoline, 7-fluoroquinoline, 8-fluoroquinoline, 3-bromoquinoline, 4-chloroquinoline, 2,4-dichloroquinoline, 3-nitroquinoline, 4-nitroquinoline, 2,3-quinolinediol, quinoline-2-thiol, 2-hydroxyquinoline-3-thiol, 2-aminoquinoline, 8-aminoquinoline, 2-hydraziquinoline, pyroloquinoline, thiazoloquinoline, pyrimido[4,5-b]quinoline and benzo[f]quinoline;

isoquinoline and related compounds, such as 1-methylisoquinoline, 3-bromomethylisoquinoline, 1-phenyl-isoquinoline, 4-phenylisoquinoline, 1,1'-biisoquinoline, 5,5'-biisoquinoline, 1-chloroisoquinoline, 5-iodoisoquinoline, 5-bromoisoquinoline, 5-nitroisoquinoline, isoquinoline-1,3-diol, 6,7-methylenedioxyisoquinoline, 1-aminoisoquinoline, 1-cyanoisoquinoline, 1-phenylbenzo[g]3,4-dihydroisoquinoline and 3-(p-aminophenyl)-5,6-dihydro-8,9-dimethyloxyimidazo[5,1-a]-isoquinoline;

acridine and related compounds, such as acridine, 1-methylacridine, 9-phenylacridine, 9-(3-bipyridinyl)acridine, 2-chloroacridine, 2-bromoacridine, 2-acridinol, acridin-3,6-diol, 4-methoxyacridine, 9-phenoxyacridine, 1-nitroacridine, 4-aminoacridine, 1-aminoacridine, 9-phenylaminoacridine, 9-hydroxyacridine, chrysaniline, acriflavine, 3,6-diamino-4,5-dimethylacridine and acrynol;

phenanthridines, such as 3,4-benzoquinoline, 6-methylphenanthridine, 6-aminomethylphenanthridine, 6-phenylphenanthridine, 6-chlorophenanthridine, 6-bromophenanthridine, 6-nitrophenanthridine, 1-aminophenanthridine and 3-hydroxyphenanthridine;

anthrazolines, such as pyrido[2,3-g]quinoline, 2,7-diphenyl[2,3-g]quinoline and 2,8-diphenylpyrido[3,2-g]quinoline;

pyridoindoles, such as 1,9-pyridoindole, 2,9-pyridoindole and 2,9-pyridoindole;

naphthyridine and related compounds, such as 1,5-naphthyridine, 1,7-naphthyridine, 1,8-naphthyridine, 1,6-naphthyridine, 2,6-naphthyridine, 2,7-naphthyridine, 1,5-naphthyridine-4-ol, 3-amino-1,5-naphthyridine, 2-amino-1,5-naphthyridine and 2-hydroxy-1,7-naphthyridine;

oxazine and related compounds, such as phenoxyazinon, resazurin, carocyanin, Nile Blue A, Merdora's Blue and Brilliant Cresyl Blue;

thiazine and related compounds, such as o-benzaminophenyl-β-phenoxycarbonylethyl sulfide, phenothiazine, nitrophenothiazine, 3-chloro-10-ethylphenothiazine, 4-amino-4'-anilinodiphenyl disulfide, 2-chloro-10-(3-dimethylamino-propyl)phenothiazine, chloropromazine, 10-(2-dimethylamino-1-propyl)phenothiazine hydrochloride, 10-[2-(1-pyrrolidyl)-ethyl]phenothiazine hydrochloride, 10-(1-methyl-3-piperidylmethyl) phenothiazine, 2-acetyl-10-(3-dimethylaminopropyl)-phenothiazine and Methylene Blue;

pyridazine and related compounds, such as cinnoline, 3-methylcinnoline, 4-chlorocinoline, 3-bromocinnoline, 4-cinnolinol, 4-aminocinnoline, phthalazine, 4-ethyl-2-phenylphthalazine, phthalazine thiol, 1(2H)-phthalazinone, 3-phenylpseudophthalazine, 4-methyl-3-phenylpseudophthalazine and 2,3-dihydro-1,4-phthalazinedione;

pyrimidine and related compounds, such as 2-cinnamethylpyrimidine, 4,6-dimethyl-2-phenylpyrimidine, 2,4,6-triphenylpyrimidine, aloxantin, 2,6-dihydroxy-4-phenylpyrimidine, 4,6-dihydroxy-2-phenylpyrimidine, 5-chloro-4,6-dihydroxy-2-phenyl-pyrimidine, sulfadiazine, sulfisomidine, thonzylamine hydrochloride, Vitamin B1, thiochrome, co-carboxylase, allomycin, 6-(furfuryl)aminopurine, pteridine, 2,4-pterine diol, 2-amino-6-methyl-4-pteridiol, xanthopterine, leucopterine, isoxanthopterine, quinazoline, 4-chloroquinazoline, 2,4-dichloroquinazoline, 4-quinazoline and 2,3-diphenyl-4-quinazoline;

pyrazine related compounds, such as 3,6-diphenylpyrazinol, quinoxaline, 2-methylquinoxaline, 2-chloroquinoxaline, 2,3-dichloroquinoxaline, 2-(o-aminoaniline)quinoxaline, N,N'-diphenyl-2,3-piperazione, 2-quinoxalinol, 2,3-quinoxaline diol, 2-aminoquinoxaline, 2,3-diaminoquinoxaline, methylquinoxaline-2-carboxylic acid ester, 2-(d-arabotetraoxybutyl)quinoxaline, flavazole, glucazidone, phenazine, phenazine-5-oxide, phenazine-5,10-dioxide, 5-methylphenazinium methylsulfate, 10-methyl-5,10-dihydro-2-phenazinecarbonitrile, 2-phenazinecarbonitrile, 1-phenazinol, 1-methoxyphenazine, 2-phenazinol, 1,6-dioxyphenazine-5,10-dioxide, 1-aminophenazine, 2-aminophenazine, 2,3-diaminophenazine, Neutral Red, 5,10-dihydrophenazine, 5-methyl-5,10-dihydrophenazine and 1,2,3,4-tetrahydrophenazine; and tri- and tetra-hetero six-membered cyclic compounds, such as 2,4,6-triphenyl-s-triazine, 2,4-dichloro-6-o-chloro-aniline-s-triazine, 5,6-diphenyl-as-triazine, 2,6-diphenyl-2,3,4,5-tetrahydro-as-triazine, 5,6-diphenyl-as-triazine-3-ol,1,2,4-benzotriazine, 1,2,4-benzotriazine-3-ol, 3-phenyl-1,2,3-benzotriazine-4-(3H)-one, 1,2,3-benzotriazine-4-ol, 1,2,3-benzotriazine-4-thiol, 3-amino-1,2,3-benzotriazine, 2,3-diphenylosotetrazine, 5,6-dimethyl-2,3-diphenylosotetrazine, 5-cyano-2,3-diphenylosotetrazine, 5,6-dibenzoyl- 2,3-diphenylosotetrazine, 2,3-dibenzoyl-5-methylosotetrazine, 2,3-dibenzoyl-5,6-dimethylosotetrazine, 2,3-dibenzoyl-5,6-diphenylosotetrazine, 2,3-bis(2,4-dichlorophenyl)-5,6-diphenyl-1,2,3,4-tetrahydro-v-Tetrazine, 1,2,3,4-tetra-ethoxycarbonyl-5,5-diphenyl-1,2,3,4,5,6-hexahydro-v-tetrazine, 7-methyl-2-(4-methylphenyl)-1,2-dihydrobenzotetrazine, 3,6-diphenyl-1,2-dihydro-s-tetrazine and 3,3,6,6-tetraphenyl-1,2,3,6-tetrahydro-s-tetrazine.

With respect to the sulfur-containing heterocyclic compounds, the following are examples thereof:

sulfur-containing heterocyclic compounds, such as 2-phenylthiophene, 2,4-diphenylthiophene, 2,3,4,5-tetraphenylthiophene, metaphenylene hydrochloride, metapyrylene hydrochloride, chlorothene citrate, thenyldiamine hydrochloride, α-quinquithienyl and α-sexithienyl;

fused thiophene type compounds, such as 3,3'-diiminothioindigo, indigoron, dihydronaphtho[2,1-b]thianaphthene, 1,3-diphenylisothianaphthene, dibenzothiophene, 2-nitrodibenzothiophene, aminodibenzothiophene, 2,8-diaminodibenzothiophene, dibenzothiophene-5-dioxide, 4-hydroxydibenzothiophene, 2,8-dihydroxydibenzothiophene, 2-chlorodibenzothiophene, 1-bromodibenzothiophene, 2,8-dibromodibenzothiophene, 2-iodidibenzothiophene, 2-acetyldibenzothiophene, 2,8-diacetyldibenzothiophene, naphthothiophene, 3-oxythiophanthrene, 2,3-thiophanthraquinone, naphtho[2,3-c]thiophene, naphtho[1,2-b]thiophene, naphtho[2,1-b]thiophene, naphtho[1,2-c]thiophene, 1,2-naphtho[2,1-b]thiophenequinone, 1-hydroxy-2-naphtho[2,1-b]thiophenealdehyde, naphtho[1,2-c]thiophene, 2H-naphtho[1,8]thiophene, benzo[b]thiophanthrene, 6,11-benzo[b]-thiophanthraquinone, benzo[g]thiophanthrene, 4,5-benzothiophanthrene and 8,9-benzothiophanthrene;

five-membered monocyclic compounds containing 2 hetero atoms, such as 5-phenyl-1,2-dithiol-3-thione, 3,4-dihydronaphtho-2,1-trithione, thiaflavone, thiacoumarin, thiaxanthene, thiaxanthohydrol, thiaxanthone, Milacil D and bisthiaxanthylene;

six-membered cyclic compounds having two or more hetero atoms, such as 2,5-diphenyl-1,4-dithiadiene, thiophenealdehyde, thianthrene, 2,7-dimethylthianthrene, 1-thianthrenyl lithium, 1-chlorothianthrene, phenoxthine, 2-vinylphenoxthine, 2-aminophenoxthine, 2-nitrophenoxthine, 3,7-dinitrophenoxthine, 10,10-diphenylphenoxthine and 2,5-diphenylthiophene.

With respect to other useful compounds, the following are examples thereof:

dicyclic compounds wherein two rings share a nitrogen atom, such as cinchonine, 2-phenylpyrrocoline, 3-ethyl-2-phenylpyrrocoline, 3-benzyl-2-phenylpyrrocoline, 3-nitroso-2-phenylpyrrocoline, 2:3-benzopyrrocoline, 1,5,8-trimethyl-2:3-benzopyrrocoline, 1-ethyl-5,8-dimethyl-2:3-benzopyrrocoline, 25 1, 8-dimethyl-2:3-benzopyrrocoline, 3-phenyl-7:8-benzopyrrocoline, cyclo[3,3,3]azine, cyclo[3,2,2]azine, 2-phenylcyclo-[3,2,2]azine, 2,3-diphenylcyclo[3,2,2]azine, tricycladine, 7-methylbenzo[a]quinolidinium bromide, benzo[b]quinolidinium salt, tetrahydro-ψ-berberine, tetrahydroberberine, laudanosoline, tetrahydro-2,3,9,10-tetraoxy-7-methyldibenzopyrrocolium chloride, homolaudanosoline, octadehydromatrine, canadinemathoiodide and tetrahydropalmatinemethoiodide; and alkaloids, such as nicotyline, 3',2-dipyridyl, cusparine, galipoline, 1-methyl-2-quinolone, casimiroin, 2-pentylquinoline, 4-hydroxy-2-pentylquinoline, 4-methoxy-2-pentylquinoline, 1-methyl-2-pentyl-4-quinolone, 4-methoxy-2-phenylquinoline, 7-methoxy-1-methyl-2-phenyl-4-quinolone, cuspareine, dictamnine, skimmianine, evolitrine, maclurin, kokusagine, kokusaginine, maculosidine, flindersiamine, evoxoidine, evoxine, evolatine, acronycidine, medicosmine, acronidine, γ-fagarine, cinconin, quininone, quinotoxin, N-bromoquinotoxin, dihydrocinchonicine, heteroquinine, evoxantidine, xanthoquinoline, 1,3-dimethoxy-10-methylacridone, evoxanthine, xanthevodine, melicopine, melicopidine, melicopicine, acronycine, flindersine, papaverin, papaveraldine, laudanosine, laudanine, codamine, protopapaverine, almepavine, 4,4',5-trimethoxy-2-vinylstilbene, coclaurine, d-isococlaurine, neprotin, corpaverine, phellodendrine, magnocurarine, coclanoline, narcotin, narcotoline, aponarceine, cinchonin, cinchotoxine, dihydrohydrastine, bicuculline, adlumidine, corlumidine, cordrastine, magnolamine, berbamine and o-methylberbamine.

In addition to the conjugated π-bond compounds as recited above, dyes and pigments having at least 5 conjugated π bonds can also be used alone or as a mixture of two or thereof, or together with any of the above-recited compounds.

As examples of such dyes and pigments, mention may be made of:

azo dyes and pigments, such as monoazo and polyazo dyes and pigments, metal complex azo dyes and pigments, stilbene azo dyes and thiazole azo dyes;

anthraquinone dyes and pigments, such as anthraquinone derivatives and anthrone derivatives;

indigoid dyes and pigments such as indigo derivatives and thioindigo derivatives;

phthalocyanine dyes and pigments;

carbonium dyes and pigments, such as diphenylmethane dyes, triphenylmethane dyes and pigments, xanthene dyes and acridine dyes;

quinoneimine dyes, such as azine dyes, oxazine dyes and thiazine dyes;

methine dyes, such as polymethine dyes and cyanine dyes;

quinoline dyes; nitro dyes; benzoquinone and naphthoquinone dyes; naphthalimide dyes and pigments; perinone dyes; sulfide dyes; fluorescent dyes; azoic dyes; and reactive dyes.

Those dyes and pigments can be used alone or as a mixture of two or more thereof.

Of the dyes and pigments as mentioned above, azine dyes are preferred over the others in the present invention.

Specific examples of dyes and pigments which can be used are enumerated below.

Azo dyes and pigments include the following compounds:

Exemplary monoazo and polyazo dyes are Basic Yellow 32, 34 and 36; Basic Orange 2, 32, 33 and 34; Basic red 17, 18, 22, 23, 24, 32, 34, 38, 39 and 40; Basic Violet 26 and 28; Basic Blue 58, 59, 64, 65, 66, 67 and 68; Basic Brown 1, 4, 11 and 12; Basic Black 8; Azoic Diazo component 4, 21, 27 and 38; Disperse Yellow 3, 4, 5, 7, 8, 23, 50, 60, 64, 66, 71, 72, 76, 78 and 79; Disperse Orange 1, 3, 5, 13, 20, 21, 30, 32, 41, 43, 45, 46, 49, 50 and 51; Disperse Red 1, 5, 7, 12, 13, 17, 43, 52, 54, 56, 58, 60, 72, 73, 74, 75, 76, 80, 82, 84, 88, 90, 97, 99, 101, 103, 113, 117, 122, 125, 126, 128 and 129; Disperse Violet 10, 24, 33, 38, 41, 43 and 96; Dispesr Blue 85, 92, 94 and 106; Disperse brown 3 and 5; Disperse Black 1, 2, 10, 26, 27, 28, 29, 30 and 31; Solvent Yellow 2, 6, 14, 15, 16, 19, 21 and 56; Solvent Orange 1, 2, 5, 6, 14 and 45; Solvent red 1, 3, 23, 24, 25, 27 and 30; Solvent Brown 3, 5 and 20; Solvent Black 3; Pigment Yellow 1, 2, 3, 4, 5, 6, 7, 10, 11, 12, 13, 14, 15, 16, 17, 23, 65, 73 and 83; pigment Orange 1, 2, 5, 13, 14, 15, 16, 17, 24 and 31; Pigment Red 1, 2, 3, 4, 5, 6, 7, 8, 9, 10, 11, 12, 13, 14, 15, 16, 17, 18, 18, 21, 22, 23, 30, 31, 32, 37, 38, 39, 40, 41, 48, 49, 50, 51, 52, 53, 54, 55, 57, 58, 60, 63, 64, 68, 112, 114 and 163; pigment Blue 25; pigment green 10; Pigment Brown 1 and 2; pigment Black 1; direct Yellow 1, 8, 11, 12, 24, 26, 27, 28, 33, 44, 50, 58, 85, 86, 87, 88, 89, 98, 100 and 110; direct Orange 1, 6, 8, 10, 26, 29, 39, 41, 49, 51, 57, 102 and 107; Direct red 1, 2, 4, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; Direct Violet 1, 7, 9, 12, 22, 35, 51, 63, 90, 94 and 98; Direct Blue 1, 2, 6, 8, 15, 22, 25, 71, 76, 77, 78, 80, 120, 123, 158, 160, 163, 165, 168, 192, 193, 194, 195, 196, 203, 207, 225, 236, 237, 246, 248 and 249; Direct Green 1, 6, 8, 28, 30, 31, 33, 37, 59, 63, 64 and 74; Direct brown 1A, 2, 6, 25, 27, 44, 58, 59, 101, 106, 173, 194, 195, 209, 210 and 211; Direct black 17, 19, 22, 32, 38, 51, 56, 71, 74, 75, 77, 94, 105, 106, 107, 108, 112, 113, 117, 118, 132, 133 and 146; Acid Yellow 11, 17, 19, 23, 25, 29, 36, 38, 40, 42, 44, 49, 61, 70, 72, 75, 76, 78, 79, 110, 127, 131, 135, 141, 142, 164 and 165; Acid Orange 1, 7, 8, 10, 19, 20, 24, 28, 33, 41, 43, 45, 51, 56, 63, 64, 65, 67 and 95; Acid red 1, 6, 8, 9, 13, 14, 18, 26, 27, 32, 35, 37, 42, 57, 75, 77, 85, 88, 89, 97, 106, 111, 114, 115, 117, 118, 119, 129, 130, 131, 133, 134, 138, 143, 145, 154, 155, 158, 168, 249, 252, 254, 257, 262, 265, 266, 274, 276, 282, 283 and 303; Acid violet 7, 11, 97 and 106; Acid Blue 29, 60, 92, 113, 117 and 120; Acid green 19, 20 and 48; Acid Brown 2, 4, 13, 14, 20, 53, 92, 100, 101, 236, 247, 266, 268, 276, 277, 282, 289, 301 and 302; acid Black 1, 7, 24, 26, 29, 31, 44, 76, 77, 94, 109 and 110; Mordant yellow 1, 3, 5, 23, 26, 30, 38 and 59; Mordant Orange 1, 4, 5, 6, 8, 29 and 37; mordant red 7, 9, 17, 19, 21, 26, 30, 63 and 89; Mordant Violet 5 and 44; Mordant Blue 7, 13, 44, 75 and 76; Mordant green 11, 15, 17 and 47; mordant brown 1, 14, 15, 19, 21, 33, 38, 40, 52 and 87, Mordant Black 1, 3, 7, 9, 11, 17, 26, 32, 38, 43, 44, 51, 54, 65, 75, 77, 84, 85, 86 and 87; Food Yellow 3 and 4; and Food Red 7 and 9;

exemplary metal complex azo dyes are Solvent Yelloe 61 and 80; Solvent Orange 37, 40 and 44; Solvent red 8, 21, 83, 84, 100, 109 and 121; Solvent Brown 37;

Solvent Blacl 23; Acid Black 51, 52, 58, 60, 62, 63, 64, 67, 72, 107, 108, 112, 115, 118, 119, 121, 122, 123, 131, 132, 139, 140, 155, 156, 157, 158, 159 and 191; Acid Yellow 59, 98, 99, 111, 112, 114, 116, 118, 119, 128, 161, 162 and 163; Acid orange 74, 80, 82, 85, 86, 87, 88, 112, 123 and 124; Acid Red 180, 183, 184, 186, 194, 198, 199, 209, 211, 215, 216, 217, 219, 256, 317, 318, 320, 321 and 322; Acid Violet 75 and 78; Acid Blue 151, 154, 158, 161, 166, 168, 170, 171, 175, 184, 187, 192, 199, 299, 234 and 236; Acid green 7, 12, 35, 43, 56, 57, 60, 61, 65, 73, 75, 76, 78 and 79; Acid Brown 19, 28, 30, 31, 39, 44, 45, 46, 48, 224, 225, 226, 231, 256, 257, 294, 296, 297, 299 and 300; Direct yellow 39; Direct Violet 47 and 48; Direct Blue 90, 98, 200, 201, 202 and 226; and Direct Brown 95, 100, 112 and 170;

an exemplary stilbene azo dye is Direct Black 62; and exemplary thiazole dyes are Direct Red 9 and 11.

Anthraquinone dyes and pigments include the following compounds:

Exemplary anthraquinone derivatives are Basic Violet 25; Basic Blue 21, 22, 44, 45, 47, 54 and 60; Azoic Diazo Component 36; Vat Yellow 2, 3, 10, 20, 22 and 33; Vat Orange 13 and 15; Vat Red 10, 13, 16, 31, 35 and 52; Vat Violet 13 and 21; Vat Blue 4, 6, 8, 12, 14, 64, 66, 67 and 72; Vat Green 8, 13, 43, 44 and 45; Vat Brown 1, 3, 22, 25, 39, 41, 44, 46, 57, 68, 72 and 73; Vat Black 8, 14, 20, 25, 27, 36, 56, 59 and 60; Disperse Orange 11; Disperse Red 4, 9, 11, 15, 53, 55, 65, 91, 92, 100, 104, 116 and 127; Disperse Violet 1, 4, 8, 23, 26, 28, 30 and 37; Disperse Blue 1, 3, 5, 6, 7, 20, 26, 27, 54, 55, 56, 60, 61, 62, 64, 72, 73, 75, 79, 81, 87, 90, 91, 97, 98, 99, 103, 104 and 105; Disperse yellow 51; Solvent Violet 13 and 14; Solvent Blue 11, 12, 35 and 36; Solvent Green 3; Pigment red 83 and 89; Pigment Blue 22; Acid Violet 31, 34, 35, 41, 43, 47, 48, 51, 54, 66 and 68; Acid Blue 23, 25, 27, 40, 41, 43, 45, 54, 62, 72, 78, 80, 82, 112, 126, 127, 129, 130, 131, 138, 140, 142, 143, 182, 183, 203, 204 and 205; Acid Green 25, 27, 28, 36, 40, 41 and 44; Acid Brown 27; Acid Black 48 and 50; Mordant red 3 and 11; Mordant Blue 8 and 48; mordant Black 13; and Pigment Violet 5;

exemplary anthrone derivatives are Vat Yellow 1 and 4; Vat Orange 1, 2, 3, 4 and 9; vat Violet 1, 9 and 10; Vat Blue 18, 19 and 20; vat Green 1, 2, 3 and 9; Vat black 9, 13, 29 and 57; Vat Red 13; and Acid Red 80, 82 and 83.

Indigoid dyes and pigments include the following compounds:

Exemplary indigo derivatives are Vat Blue 1, 3, 5, 35 and 41; Reduced Vat Blue 1; Pigment Violet 19 and 122; Acid Blue 74 and 102; Solubilized vat Blue 5 and 41; Solubilized Vat Black 1; and Food Blue 1;

exemplary thioindigo derivatives are Vat Orange 5; Vat Red 1, 2 and 61; Vat Violet 2 and 3; Pigment Red 87 and 88; and Vat Brown 3.

Phthalocyanine dyes and pigments may include, for example, Solvent Blue 55; Pigment Blue 15, 16 and 17; Pigment Green 36, 37 and 38; Direct Blue 86 and 199; and Mordant Blue 58.

Carbonium dyes and pigments include the following compounds:

An exemplary diphenylmethane dye is Basic Yellow 2;

exemplary triphenylmethane dyes are Basic Red 9; Basic Violet 1, 3 and 14; Basic Blue 1, 5, 7, 19, 26, 28, 29, 40 and 41; Basic Green 1 and 4; Solvent Violet 8; Solvent Blue 2 and 73; Pigment Violet 3; Pigment Blue 1, 2 and 3; Pigment Green 1, 2 and 7; Direct Blue 41; Acid Violet 15 and 49; Acid Blue 1, 7, 9, 15, 22, 83, 90, 93, 100, 103 and 104; Acid Green 3, 9 and 16; Mordant Violet 1; Mordant Blue 1, 29 and 47; Food Violet 2; Food Blue 2; and Food Green 2;

exemplary xanthene dyes are Basic Red 1; Solvent Red 49; Pigment Red 81 and 90; Pigmant Violet 1,2 and 23; Acid Red 51, 52, 87, 92 and 94; Mordant Violet 1; Mordant Blue 1, 29 and 47; and Food Red 14; and exemplary acridine dyes are Basic Orange 14 and 15.

Quinoneimine dyes include the following compounds:

Exemplary azine dyes are Basic Red 2; Basic Black 2; Solvent Black 5 and 7; Acid Blue 59; Acid Black 2;

exemplary oxazine dyes are Basic Blue 3; Direct Blue 106 and 108; and exemplary thiazine dyes are Basic Yellow 1; Basic Blue 9, 24 and 25.

Methine dyes include the following compounds:

Exemplary polymethine (or cyanine) dyes are Basic Yellow 11, 13, 14, 19, 21, 25, 28, 33 and 35; basic Orange 21 and 22; Basic Red 12, 13, 14, 15, 27, 29, 35, 36 and 37; and Basic Violet 7, 15, 21 and 27.

Quinoline dyes may be exemplified by Basic Green 6; Disperse Yellow 54 and 56; Solvent Yellow 33; and Acid Yellow 3.

Nitro dyes may be exemplified by Disperse Yellow 1, 33, 39, 42, 49 and 54; and Acid Yellow 1.

Benzoquinone and naphthoquinone dyes may be exemplified by Disperse Blue 58 and 108; and Acid Brown 103, 104, 106, 160, 161, 165 and 188.

Naphthalimide dyes and pigments may be exemplified by Pigment Red 123; Vat Violet 23 and 39; and Acid Yellow 7.

Perinone dyes may be exemplified by Vat Orange 7 and 15.

Sulfide dyes may include, for example, Solubilized Sulfur Yellow 2; Sulfur Yellow 4; Sulfur Orange 3; Sulfur Red 2, 3, 5 and 7; Solubilized Sulfur Blue 15; Sulfur Blue 2, 3, 4, 6, 7, 9 and 13; Sulfur Green 2, 3, 6, 14 and 27; Solubilized Sulfur Brown 1 and 51; Sulfur Brown 7, 12, 15 and 31; Sulfur Black 1, 2, 5, 6, 10, 11 and 15; vat Yellow 35, 42 and 43; and Vat Blue 43 and 56.

Fluorescent dyes may include, for example, fluorescent brightening agents 14, 22, 24, 30, 32, 37, 45, 52, 54, 55, 56, 84, 85, 86, 87, 90, 91, 104, 112, 121, 134, 135, 153, 162, 163, 164, 166, 167, 168, 169, 170, 171, 172, 173, 174, 175, 176 and 177.

Azoic dyes may include, for example, Azoic Diazo Component 17, 20, 22, 24, 26, 31, 35, 41, 47, 48, 109 and 121; Azoic Coupling Component 2, 3, 4, 5, 7, 8, 10, 11, 12, 14, 15, 16, 17, 18, 19, 20, 23, 26, 28, 29, 35, 36, 37, 41 and 108; Azoic brown 2, 7, 11 and 15; Azoic Black 1 and 5; Azoic Yellow 1 and 2; Azoic Orange 2, 3 and 7; azoic red 1, 2, 6, 9, 16 and 24; Azoic Violet 1, 2, 6, 7, 9 and 10; and azoic Green 1.

Reactive dyes may include, for example, Reactive Yellow 1, 2, 3, 4, 6, 7, 11, 12, 13, 14, 15, 16, 17, 18, 22, 23, 24, 25, 26, 27, 37 and 42; Reactive Orange 1, 2, 4, 5, 7, 13, 14, 15, 16, 18, 20, 23 and 24; Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64; Reactive Violet 1, 2, 4, 5, 8, 9 and 10; Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46; Reactive Green 5, 6, 7 and 8; Reactive Brown 1, 2, 5, 7, 8, 9, 10, 11, 14 and 16;and Reactive Black 1, 3, 4, 5, 6, 8, 9, 10, 12, 13, 14 and 18.

In preparing a solution for the present treatment, the present conjugated π-bond compound, in some cases, together with the dye or/and pigment as recited above, may be used as it is, or dissolved or dispersed in a proper solvent. It is desirable for the solution to be prepared so as to have a concentration of at least 0.01 weight %.

With respect to solvents usable for preparing the solution for the present treatment, water and various organic solvents are examples thereof.

Specific examples of such organic solvents include aliphatic hydrocarbons, such as gasoline, petroleum, benzine, mineral spirit, petroleum naphtha, V. M. & P. Naphtha, decaline, tetralin and p-cymene; aromatic hydrocarbons, such as benzene, toluene and xylene; halogenated hydrocarbons, such as trichloroethylene, perchloroethylene, chloroform, carbon tetrachloride, monobromobenzene, monochlorobenzene and dichlorobenzene; alcohols, such as amyl alcohol, ethyl alcohol, isopropyl alcohol, 2-ethylbutyl alcohol, 2-ethylhexyl alcohol, cyclohexanol, methyl alcohol, methylamyl alcohol, benzyl alcohol and butyl alcohol; ketones, such as acetone, acetonylacetone, diisobutyl ketone, diethyl ketone, dipropyl ketone, methyl amyl ketone, methylcyclohexanone, methyl dipropyl ketone, methyl ethyl ketone, methyl n-hexyl ketone, methyl idobutyl ketone and methyl propyl ketone; esters, such as acetates, butyrates, propionates and formates; alcohol esters, such as butyl lactate, isopropyl lactate, ethyl lactate, ethyl hydroxypropionate and diethyl maleate; ketone esters, such as ethyl acetoacetate and ethyl pyruvates; ethers, such as isopropyl ether, ethyl ether, diethyl carbitol, diethyl cellosolve and butyl ether; ketone alcohols, such as acetonyl methanol, diacetone alcohol, dihydroxyl acetone and pyruvinalcohol; ether alcohols, such as isopropyl cellosolve, carbitol, glycidol, cellosolve, glycol ether, benzyl cellosolve, butyl carbitol, butyl cellosolve, methyl cellosolve and triethylene glycol monoethyl ether; ketone ethers, such as acetal ethyl ether, acetonylmethanol ethyl ether and methyl ethoxyethyl ether; and ester ethers, such as butyl carbitol acetate, butyl cellosolve acetate, carbitol acetate, cellosolve acetate, 3-methoxybutyl acetate, methyl carbitol acetate and methyl cellosolve acetate.

In a case where an organic solvent highly compatible with water, such as an alcohol (e.g., methyl alcohol, ethyl alcohol, allyl alcohol, n-propyl alcohol or isopropyl alcohol), a ketone (e.g., acetone, acetonylacetone or diacetone alcohol), an ester (e.g., ethylene glycol monomethyl ether acetate, diethylene glycol methyl ether acetate or monoethyl ether acetate), an ether (e.g., dioxane, ethylene glycol monomethyl ether or ethylene glycol monoethyl ether), a furan (e.g., tetrahydrofuran or furfuryl alcohol) or an aprotic solvent (e.g., acetonitrile, N,N-dimethylformamide or N,N-dimethylacetamide), is used, water can be added in such an amount as not to check the dissolution or dispersion of the present conjugated n-bond compound, and thereby the production cost of the solution can be reduced and the safety upon transportation and storage of the solution can be elevated.

Further, the present conjugated π-bond compound can produce a more favorable result when it is used in combination with a phosphorus compound, such as hypophosphoric acid pyrophosphoric acid or polyphosphoric acid. Specifically, the treatment with a solution containing the present conjugated π-bond compound may be carried out after or before the treatment with a solution containing a phosphorus compound, or these treatments may be carried out simultaneously.

The present invention has no particular restriction as to the way of treating a hydrogen absorbing alloy, but any of known ways, e.g., immersing a hydrogen absorbing alloy in a treating solution, can be adopted. For effectively achieving the treatment, it is desirable that, prior to the immersion, the hydrogen absorbing alloy be ground to a powder. Preferably, the agitation is carried out during the immersion, and thereby the initial activity of the electrode using the thus treated alloy powder can be further enhanced.

When the hydrogen absorbing alloy powder treated in accordance with the present method is applied to the negative electrode of a nickel-hydrogen secondary battery, the initial activity of the secondary battery undergoes a significant improvement. As a reason for this improvement, it can be presumed that the acid or alkali in the solution of highly conjugate unsaturated compound acts on incidental substances, such as oxides of rare earth metals, present at the surface of a hydrogen absorbing alloy to remove such incidental substances from the alloy surface, and the highly conjugate unsaturated compound is adsorbed immediately on the thus activated alloy surface to cover the alloy surface, thereby effecting the protection of the alloy surface.

Additionally, the effect of the treatment according to the present invention is greater than the effect accomplished by the successive treatment that a ground hydrogen absorbing alloy is first treated with an acid or alkali and then treated with a solution of highly conjugated unsaturated compound. As a reason for such a distinction, it can be supposed that, in the case of successive treatment, even if the treatment with a solution of highly conjugated unsaturated compound is carried out speedily after the treatment with an acid or alkali, it is difficult to inhibit the surface of a hydrogen absorbing alloy to slightly change its quality during the interval between the two treatments; while, in the case where the treatment with a solution of highly conjugated unsaturated compound is carried out in the presence of an acid or alkali, the highly conjugated unsaturated compound acts on the surface of a hydrogen absorbing alloy simultaneously with an acid or alkali, thereby completely protecting the alloy surface from change in quality. This striking effect of simultaneous action can be obtained only by allowing a highly conjugated unsaturated compound to coexist with an acid or alkali.

The hydrogen absorbing alloy powder according to the present invention can be easily prepared in the following manner; A hydrogen absorbing alloy produced by fusing a metallic mixture having the composition as mentioned hereinbefore by means of, e.g., a known high frequency induction furnace is ground to a powder. And this powder is immersed in a solution containing both a highly conjugated unsaturated compound and an acid or alkali, and then dried.

Further, an electrode according to the present invention can be obtained as follows: The alloy powder treated in accordance with the present invention is admixed with a binder, such as polyvinyl alcohol, a cellulose derivative, PTFE or polyethylene oxide, to prepare a paste. This paste is coated on a three-dimensional conductive support, such as a textile Ni support or a foamed Ni support, or a two-dimensional conductive support, such as a punching metal, pressed and then dried; or it is pressed into the form of a sheet, wrapped around a conductive support, and then attached to the conductive support by application of pressure.

In accordance with the present method, a hydrogen absorbing alloy powder having not only high activity but also excellent keeping quality and easiness of handling can be obtained with great ease. Further, the electrode using the hydrogen absorbing allow powder obtained in accordance with the present method acts as the negative electrode of a nickel-hydrogen secondary battery having excellent initial activity.

The present invention will now be illustrated in greater detail by reference to the following examples. However, the invention should not be construed as being limited to these examples.

EXAMPLES AND COMPARATIVE EXAMPLES

The metallic elements Mm, Al, Co Mn and Ni were weighed out in the atomic ratio of 1.00:0.30:0.75:0.20:3.75. The metallic element Mm used herein was a Mish metal constituted of 61 weight % of La, 7 weight % of Ce, 23 weight % of Pr and 9 weight % of Nd. These elements were fused under the atmosphere of argon by means of a high frequency induction furnace to give a hydrogen absorbing alloy ingot. This ingot was subjected to a heat treatment at 1020° C., and then ground to a fine powder having an average particle size of 32 μm.

The powder thus obtained was mixed with a solution prepared by adding to a solution of highly conjugated unsaturated compound, the concentration of which was chosen from the range of 0.01 to 30 weight %, an acid in such an amount that the solution had its acid concentration between 0.01 and 1.5 normal (N) or an alkali in such an amount that the solution had its alkali concentration between 0.1 and 12 N. Therein, the powder and the solution were used in the proportion of 2 to 1 (kg:liter). The resulting mixture was filtered off, and then dried. The thus treated powder was used for an electrode, and examined for the battery characteristics to evaluate the electrode performance and the quality of the treated hydrogen absorbing alloy powder.

<Making Secondary Battery>

The treated powder in an amount of 2 g was mixed with 0.5 g of a 3 weight % solution of polyvinyl alcohol (average polymerization degree: 200) to prepare a paste. This paste was applied to textile Ni, dried, and then subjected to pressure molding to form into a negative electrode having a thickness of 0.5 mm. Further, a sintered nickel prepared by a conventional method was used as a nickel oxide positive electrode, a nonwoven fabric of polypropylene was used as a separator, and a 6N aqueous solution of KOH was used as an electrolytic solution. These were combined with the foregoing negative electrode to make a negative electrode-regulated open-type nickel-hydrogen secondary battery.

<Evaluation of Initial Activity and Initial Capacity>

The thus made battery was charged for 5 hours by sending thereto an electric current of 180 mA at a temperature regulated at 20° C., and then made to discharge an electric current of 120 mA until the battery voltage was dropped to 1.0 V. This charge-discharge cycle operation was repeated for 10 times. The initial activity was evaluated by the capacity measured at the first cycle, and the initial capacity was evaluated by the capacity measured at the tenth cycle. These results are shown in Tables 1 to 4 together with the conditions employed in each treatment.

In these Tables, Experiment No. to which the mark * is attached corresponds to Comparative Example, and the symbols stand for the following compounds respectively:

D1: Azo dye (C.I. Solvent Black 3); 2,3-Dihydro-2,2-dimethyl-6{[1-naphthyl-4-phenylazo)]-azo}-1H-pyrimidine (Mw: 400)

DPQ: Amine-Quinone Condensate; 1,8-Diaminenaphthalene-paraquinone condensate (Mw:1,000)

D2: Azine dye (C.I. Solvent Black 5) (Mw: 500)

FE: Phenothiazine

R: Sulfonate of D1 (C.I. Solvent Black 2) (Mw: 600)

C: Hydrochloric acid

N: Nitric acid

S: Sulfuric acid

K; KOH

N; NaOH

L; LiOH

K/L; KOH/LiOH=9/1

Additionally, the average molecular weight (Mw) values set forth above were each determined on the polystyrene basis by performing gel permeation chromatography (GPC) under the following conditions:

Column; Guard column (Slim-pack GPC-800DP, commercial name, made by Shimadzu Corporation), and Analytical column (Slim-pack GPC-803D, 802D, commercial names, made by Shimadzu Corporation).

Mobile phase; 10 mM LiBr/DMF.

Flow rate; 1.0 ml/mim.

Detector; RI

Temperature; 60° C.

TABLE 1

| Experiment No. | Treating agent | Treating agent concentration (wt %) | Mineral acid | Mineral acid concentration (N) | Treatment temperature (° C.) | Treatment time (min) | 1st-cycle capacity (mAh/g) | 10th-cycle capacity (mAh/g) |
|---|---|---|---|---|---|---|---|---|
| 0* | none | 0 | — | — | — | — | 204 | 291 |
| A-1* | none | 0 | C | 0.15 | 60 | 60 | 219 | 290 |
| A-2 | D1 | 0.5 | C | 0.15 | 20 | 60 | 275 | 322 |
| A-3 | D1 | 0.5 | C | 0.15 | 60 | 60 | 290 | 325 |
| A-4 | D1 | 0.5 | C | 0.15 | 130 | 60 | 280 | 317 |
| A-5 | D1 | 0.5 | C | 0.15 | 150 | 60 | 215 | 292 |
| A-6 | DPQ | 0.5 | C | 0.01 | 60 | 60 | 217 | 287 |
| A-7 | DPQ | 0.5 | C | 0.05 | 60 | 60 | 274 | 319 |
| A-8 | DPQ | 0.5 | C | 0.15 | 60 | 60 | 279 | 317 |
| A-9 | DPQ | 0.5 | C | 0.5 | 60 | 60 | 285 | 315 |
| A-10 | DPQ | 0.5 | C | 1 | 60 | 60 | 298 | 321 |
| A-11 | DPQ | 0.5 | C | 1.5 | 60 | 60 | 218 | 284 |
| A-12 | D2 | 0.5 | C | 0.15 | 60 | 60 | 293 | 325 |
| A-13 | D2 | 0.5 | N | 0.15 | 60 | 60 | 278 | 316 |
| A-14 | D2 | 0.5 | S | 0.15 | 60 | 60 | 272 | 318 |

*Comparative Example

TABLE 2

| Experiment No. | Treating agent | Treating agent concentration (wt %) | Mineral acid | Mineral acid concentration (N) | Treatment temperature (° C.) | Treatment time (min) | 1st-cycle capacity (mAh/g) | 10th-cycle capacity (mAh/g) |
|---|---|---|---|---|---|---|---|---|
| A-15 | FE | 0.5 | C | 0.15 | 60 | 60 | 281 | 319 |
| A-16 | R | 0.005 | C | 0.15 | 60 | 60 | 217 | 282 |
| A-17 | R | 0.01 | C | 0.15 | 60 | 60 | 279 | 314 |
| A-18 | R | 0.5 | C | 0.15 | 60 | 60 | 290 | 328 |
| A-19 | R | 10 | C | 0.15 | 60 | 60 | 282 | 318 |
| A-20 | R | 15 | C | 0.15 | 60 | 60 | 214 | 286 |
| A-21 | D2/R | 0.5 | C | 0.15 | 60 | 3 | 215 | 284 |
| A-22 | D2/R | 0.5 | C | 0.15 | 60 | 10 | 276 | 317 |
| A-23 | D2/R | 0.5 | C | 0.15 | 60 | 60 | 294 | 326 |
| A-24 | D2/R | 0.5 | C | 0.15 | 60 | 300 | 288 | 321 |
| A-25 | D2/R | 0.5 | C | 0.15 | 60 | 600 | 281 | 318 |
| A-26 | D2/R | 0.5 | C | 0.15 | 60 | 900 | 216 | 294 |

D2/R = 1/1 by weight

TABLE 3

| Experiment No. | Treating agent | Treating agent concentration (wt %) | Mineral acid | Mineral acid concentration (N) | Treatment temperature (° C.) | Treatment time (min) | 1st-cycle capacity (mAh/g) | 10th-cycle capacity (mAh/g) |
|---|---|---|---|---|---|---|---|---|
| 0* | none | 0 | — | — | — | — | 204 | 291 |
| B-1* | none | 0 | K | 6.0 | 60 | 60 | 211 | 289 |
| B-2 | D1 | 0.5 | K | 6.0 | 20 | 60 | 273 | 321 |
| B-3 | D1 | 0.5 | K | 6.0 | 60 | 60 | 288 | 324 |
| B-4 | D1 | 0.5 | K | 6.0 | 130 | 60 | 277 | 319 |
| B-5 | D1 | 0.5 | K | 6.0 | 150 | 60 | 210 | 292 |
| B-6 | DPQ | 0.5 | K | 0.1 | 60 | 60 | 207 | 293 |
| B-7 | DPQ | 0.5 | K | 1.0 | 60 | 60 | 271 | 319 |
| B-8 | DPQ | 0.5 | K | 3.0 | 60 | 60 | 273 | 317 |
| B-9 | DPQ | 0.5 | K | 6.0 | 60 | 60 | 275 | 318 |
| B-10 | DPQ | 0.5 | K | 10 | 60 | 60 | 278 | 315 |
| B-11 | DPQ | 0.5 | K | 12 | 60 | 60 | 212 | 294 |
| B-12 | D2 | 0.5 | K | 6.0 | 60 | 60 | 283 | 320 |
| B-13 | D2 | 0.5 | N | 6.0 | 60 | 60 | 280 | 321 |
| B-14 | D2 | 0.5 | L | 6.0 | 60 | 60 | 270 | 315 |
| B-15 | D2 | 0.5 | K/L | 6.0 | 60 | 60 | 287 | 323 |

*Comparative Examples

TABLE 4

| Experiment No. | Treating agent | Treating agent concentration (wt %) | Alkali | Alkali concentration (N) | Treatment temperature (° C.) | Treatment time (min) | 1st-cycle capacity (mAh/g) | 10th-cycle capacity (mAh/g) |
|---|---|---|---|---|---|---|---|---|
| B-16 | FE | 0.5 | K | 6.0 | 60 | 60 | 271 | 319 |
| B-17 | R | 0.005 | N | 6.0 | 60 | 60 | 210 | 290 |
| B-18 | R | 0.01 | N | 6.0 | 60 | 60 | 279 | 316 |
| B-19 | R | 0.5 | N | 6.0 | 60 | 60 | 289 | 325 |
| B-20 | R | 10 | N | 6.0 | 60 | 60 | 284 | 317 |
| B-21 | R | 15 | N | 6.0 | 60 | 60 | 204 | 296 |
| B-22 | D2/R | 0.5 | K | 6.0 | 60 | 3 | 208 | 290 |
| B-23 | D2/R | 0.5 | K | 6.0 | 60 | 10 | 275 | 315 |
| B-24 | D2/R | 0.5 | K | 6.0 | 60 | 60 | 290 | 323 |
| B-25 | D2/R | 0.5 | K | 6.0 | 60 | 300 | 287 | 320 |
| B-26 | D2/R | 0.5 | K | 6.0 | 60 | 600 | 280 | 318 |
| B-27 | D2/R | 0.5 | K | 6.0 | 60 | 900 | 213 | 295 |

<Evaluation of Storage Characteristics>

Secondary batteries were made in the same manner as escribed above, except that the alloy powders treated as shown in Tables 1 to 4 were used respectively after two months' storage, and their initial activities and initial capacities were evaluated by the same procedures as described above. The evaluation results are shown in Tables 5 to 8.

In these Tables, Experiment No. to which the mark * is attached corresponds to Comparative Example, and the term "Treating Agent" means a highly conjugate unsaturated compound. Additionally, the symbols used therein stand for the same compounds as in the foregoing Tables (1 to 4), namely:

D1; Azo dye (C.I. Solvent Black 3) in MeOH

DPQ; Amine-quinone condensate in 1:1 mixture of 1-methyl-2-pyrrolidone and MeOH

D2; Azine dye (C.I. Solvent Black 5) in 1:1 mixture of toluene and MeOH

FE; Phenothiazine in MeOH

R; Sulfonate of D1 (C.I. Solvent Black 2) in 1:1 mixture of toluene and MeOH

C; Hydrochloric acid

N; Nitric acid

S; Sulfuric acid

K; KOH

N; NaOH

L; LiOH

K/L; KOH/LiOH=9/1

TABLE 5

| Experiment No. | Treating agent | Treating agent concentration (wt %) | Mineral acid | Mineral acid concentration (N) | Treatment temperature (° C.) | Treatment time (min) | 1st-cycle capacity (mAh/g) | 10th-cycle capacity (mAh/g) |
|---|---|---|---|---|---|---|---|---|
| 100* | none | 0 | — | — | — | — | 161 | 282 |
| A-101* | none | 0 | C | 0.15 | 60 | 60 | 142 | 280 |
| A-102 | D1 | 0.5 | C | 0.15 | 20 | 60 | 279 | 319 |
| A-103 | D1 | 0.5 | C | 0.15 | 60 | 60 | 289 | 323 |
| A-104 | D1 | 0.5 | C | 0.15 | 130 | 60 | 279 | 315 |
| A-105 | D1 | 0.5 | C | 0.15 | 150 | 60 | 208 | 278 |
| A-106 | DPQ | 0.5 | C | 0.01 | 60 | 60 | 213 | 284 |
| A-107 | DPQ | 0.5 | C | 0.05 | 60 | 60 | 271 | 319 |
| A-108 | DPQ | 0.5 | C | 0.15 | 60 | 60 | 278 | 318 |
| A-109 | DPQ | 0.5 | C | 0.5 | 60 | 60 | 281 | 314 |
| A-110 | DPQ | 0.5 | C | 1 | 60 | 60 | 288 | 320 |
| A-111 | DPQ | 0.5 | C | 1.5 | 60 | 60 | 204 | 274 |
| A-112 | D2 | 0.5 | C | 0.15 | 60 | 60 | 293 | 323 |
| A-113 | D2 | 0.5 | N | 0.15 | 60 | 60 | 276 | 314 |
| A-114 | D2 | 0.5 | S | 0.15 | 60 | 60 | 272 | 3.17 |

*Comparative Examples

TABLE 6

| Experiment No. | Treating agent | Treating agent concentration (wt %) | Mineral acid | Mineral acid concentration (N) | Treatment temperature (° C.) | Treatment time (min) | 1st-cycle capacity (mAh/g) | 10th-cycle capacity (mAh/g) |
|---|---|---|---|---|---|---|---|---|
| A-115 | FE | 0.5 | C | 0.15 | 60 | 60 | 279 | 318 |
| A-116 | R | 0.005 | C | 0.15 | 60 | 60 | 206 | 271 |
| A-117 | R | 0.01 | C | 0.15 | 60 | 60 | 270 | 314 |
| A-118 | R | 0.5 | C | 0.15 | 60 | 60 | 290 | 326 |
| A-119 | R | 10 | C | 0.15 | 60 | 60 | 282 | 317 |
| A-120 | R | 15 | C | 0.15 | 60 | 60 | 215 | 281 |
| A-121 | D2/R | 0.5 | C | 0.15 | 60 | 3 | 205 | 280 |
| A-122 | D2/R | 0.5 | C | 0.15 | 60 | 10 | 271 | 315 |
| A-123 | D2/R | 0.5 | C | 0.15 | 60 | 60 | 293 | 325 |
| A-124 | D2/R | 0.5 | C | 0.15 | 60 | 300 | 289 | 319 |
| A-125 | D2/R | 0.5 | C | 0.15 | 60 | 600 | 280 | 318 |
| A-126 | D2/R | 0.5 | C | 0.15 | 60 | 900 | 217 | 290 |

TABLE 7

| Experiment No. | Treating agent | Treating agent concentration (wt %) | Alkali | Alkali concentration (N) | Treatment temperature (° C.) | Treatment time (min) | 1st-cycle capacity (mAh/g) | 10th-cycle capacity (mAh/g) |
|---|---|---|---|---|---|---|---|---|
| B-100* | none | 0 | K | 0 | — | — | 161 | 282 |
| B-101* | none | 0 | K | 6.0 | 60 | 60 | 148 | 281 |
| B-102 | D1 | 0.5 | K | 6.0 | 20 | 60 | 270 | 317 |
| B-103 | D1 | 0.5 | K | 6.0 | 60 | 60 | 287 | 325 |
| B-104 | D1 | 0.5 | K | 6.0 | 130 | 60 | 272 | 315 |
| B-105 | D1 | 0.5 | K | 6.0 | 150 | 60 | 180 | 288 |
| B-106 | DPQ | 0.5 | K | 0.1 | 60 | 60 | 152 | 285 |
| B-107 | DPQ | 0.5 | K | 1.0 | 60 | 60 | 269 | 315 |
| B-108 | DPQ | 0.5 | K | 3.0 | 60 | 60 | 271 | 316 |
| B-109 | DPQ | 0.5 | K | 6.0 | 60 | 60 | 272 | 316 |
| B-110 | DPQ | 0.5 | K | 10 | 60 | 60 | 277 | 315 |
| B-111 | DPQ | 0.5 | K | 12 | 60 | 60 | 188 | 293 |
| B-112 | D2 | 0.5 | K | 6.0 | 60 | 60 | 282 | 321 |
| B-113 | D2 | 0.5 | N | 6.0 | 60 | 60 | 278 | 321 |
| B-114 | D2 | 0.5 | L | 6.0 | 60 | 60 | 270 | 316 |
| B-115 | D2 | 0.5 | K/L | 6.0 | 60 | 60 | 288 | 323 |

*Comparative Examples

TABLE 8

| Experiment No. | Treating agent | Treating agent concentration (wt %) | Alkali | Alkali concentration (N) | Treatment temperature (° C.) | Treatment time (min) | 1st-cycle capacity (mAh/g) | 10th-cycle capacity (mAh/g) |
|---|---|---|---|---|---|---|---|---|
| B-116 | FE | 0.5 | K | 6.0 | 60 | 60 | 268 | 317 |
| B-117 | R | 0.005 | N | 6.0 | 60 | 60 | 175 | 288 |
| B-118 | R | 0.01 | N | 6.0 | 60 | 60 | 268 | 315 |
| B-119 | R | 0.5 | N | 6.0 | 60 | 60 | 289 | 326 |
| B-120 | R | 10 | N | 6.0 | 60 | 60 | 285 | 317 |
| B-124 | R | 15 | N | 6.0 | 60 | 60 | 204 | 289 |
| B-122 | D2/R | 0.5 | K | 6.0 | 60 | 3 | 151 | 281 |
| B-123 | D2/R | 0.5 | K | 6.0 | 60 | 10 | 269 | 314 |
| B-124 | D2/R | 0.5 | K | 6.0 | 60 | 60 | 288 | 323 |
| B-125 | D2/R | 0.5 | K | 6.0 | 60 | 300 | 288 | 318 |
| B-126 | D2/R | 0.5 | K | 6.0 | 60 | 600 | 282 | 315 |
| B-121 | D2/R | 0.5 | K | 6.0 | 60 | 900 | 180 | 287 |

As is apparent from the results of Experiment Nos. 0, A-1, A-3, A-8, A-12, A-15, A-18 and A-23, the treatment with an acidic solution according to the present invention was instrumental in elevating the initial activity and initial capacity of the secondary battery. Further, the results shown above demonstrate that the expected effects were fully achieved by controlling the treating solution, which contained a highly conjugate unsaturated compound having at least 5 conjugated $\pi$ bonds and a molecular weight of at least 100, so that the acid concentration thereof was in the range of 0.1 to 1 normal (N) by the addition of a mineral acid. Furthermore, it is presumed from the results of Experiment Nos. A-16 to A-20 that the highly conjugated unsaturated compound was significantly effective when the concentration thereof was in the range of about 0.01 to 10 weight % and its effects were maximal in the concentration range of about 0.1 to 1 weight %.

As for the treatment temperature, it was confirmed by the results of Experiment Nos. A-2 to A-5 that the treatment was less effective when it was carried out at a temperature higher than 130° C. As a cause thereof, it is assumed that the highly conjugated unsaturated compound decomposes at elevated temperatures. As for the mineral acid concentration in the treating solution, it can be seen from the results of Experiment Nos. A-6 to A-11 that the effects of a mineral acid were produced to a satisfactory extent when the concentration was from 0.05 to 1.0 N.

With respect to the storage characteristics, the comparison between the data set forth in Tables 1–2 and those set forth in Tables 5–6 indicates that, in contrast to the comparative secondary batteries, the secondary batteries using the hydrogen absorbing alloy powders treated in accordance with the present invention were free from the lowering of initial activity and initial capacity due to the use of the stored alloy powders, so that the alloy powder having undergone the present treatment kept its favorable characteristics upon storage.

As is apparent from the results of Experiment Nos. 0, B-1, B-3, B-9, B-12, B-16, B-19 and B-24, the treatment with an alkaline solution according to the present invention was instrumental in elevating the initial activity and initial capacity of the secondary battery. Further, the experimental results shown above demonstrate that the expected effects were fully achieved by controlling the treating solution, in which was contained a highly conjugated unsaturated compound having at least 5 conjugated π bonds and a molecular weight of at least 100, so as to have an alkalinity of from 1.0 to 10.0 N. As for the concentration of the highly conjugated unsaturated compound in the an alkaline treating solution, the results of Experiment Nos. B-17 to B-21 prove that the effects of the highly conjugated unsaturated compound were particularly clear when it was used in the concentration range of about 0.01 to 10 weight % and those effects were maximal in the concentration range of about 0.1 to 1 weight %.

As for the treatment temperature, it was confirmed by the results of Experiment Nos. B-2 to B-5 that the treatment was less effective when it was carried out at a temperature higher than 130° C. As a cause thereof, it is assumed that the highly conjugate unsaturated compound decomposes at elevated temperatures. As for the alkali concentration in the treating solution, it was clarified by the results of Experiment Nos. B-6 to B-11 that the effects of alkali were great in the concentration range of 0.05 to 1.0 N.

With respect to the storage characteristics, it can be seen from comparison between the data set forth in Tables 3–4 and those set forth in Tables 7–8 that, in contrast to the comparative secondary batteries, the secondary batteries using the hydrogen absorbing alloy powders treated in accordance with the present invention were free from the lowering of initial activity and initial capacity due to the use of the stored alloy powders, so that the alloy powder having undergone the present treatment kept its favorable characteristics upon storage.

For the purpose of comparing between the present treatment and a successive treatment, the following comparative experiments were carried out. In each of the experiments according to the successive treatment, the alloy powder was treated with an acid first, and then with a highly conjugated unsaturated compound. Using the thus treated alloy powder immediately after the treatment and after two-month storage, secondary batteries were made in the same manner as described above. The results obtained are shown in Table 9 (the cases of using the treated alloy powders immediately after the treatment) and Table 10 (the cases of using the treated alloy powders after two-month storage).

TABLE 9

| | Acid Treatment | | | | Treatment with Treating Agent | | | | |
| --- | --- | --- | --- | --- | --- | --- | --- | --- | --- |
| Experiment No. | Mineral acid | Mineral acid concentration (N) | Temperature (° C.) | Time (hr) | Treating agent | Treating agent concentration (wt %) | Treatment temperature (° C.) | Treatment time (min) | 1st-cycle capacity (mAh/g) | 10th-cycle capacity (mAh/g) |
| A-201* | C | 0.15 | 60 | 0.5 | D1 | 0.5 | 60 | 60 | 270 | 310 |
| A-202* | C | 0.15 | 60 | 0.5 | DPQ | 0.5 | 60 | 60 | 259 | 307 |
| A-203* | C | 0.15 | 60 | 0.5 | D2 | 0.5 | 60 | 60 | 273 | 314 |
| A-204* | C | 0.15 | 60 | 0.5 | FE | 0.5 | 60 | 60 | 261 | 304 |
| A-205* | C | 0.15 | 60 | 0.5 | R | 0.5 | 60 | 60 | 270 | 314 |
| A-206* | C | 0.15 | 60 | 0.5 | D2/R | 0.5 | 60 | 60 | 274 | 315 |

*Comparative Examples

TABLE 10

| | Acid Treatment | | | | Treatment with Treating Agent | | | | |
| --- | --- | --- | --- | --- | --- | --- | --- | --- | --- |
| Experiment No. | Mineral acid | Mineral acid concentration (N) | Temperature (° C.) | Time (hr) | Treating agent | Treating agent concentration (wt %) | Treatment temperature (° C.) | Treatment time (min) | 1st-cycle capacity (mAh/g) | 10th-cycle capacity (mAh/g) |
| A-211* | C | 0.15 | 60 | 0.5 | D1 | 0.5 | 60 | 60 | 270 | 311 |
| A-212* | C | 0.15 | 60 | 0.5 | DPQ | 0.5 | 60 | 60 | 259 | 306 |
| A-213* | C | 0.15 | 60 | 0.5 | D2 | 0.5 | 60 | 60 | 273 | 313 |
| A-214* | C | 0.15 | 60 | 0.5 | FE | 0.5 | 60 | 60 | 261 | 304 |
| A-215* | C | 0.15 | 60 | 0.5 | R | 0.5 | 60 | 60 | 270 | 314 |
| A-216* | C | 0.15 | 60 | 0.5 | D2/R | 0.5 | 60 | 60 | 274 | 314 |

*Comparative Examples

Further, the comparative experiments according to another successive treatment were carried out. In each of the experiments, the hydrogen absorbing alloy powder was treated with an alkali first, and then with a highly conjugated unsaturated compound. Using each of the thus treated alloy powders immediately after the treatment and after two-month storage, secondary batteries were made in the same manner as described above. The results obtained are shown in Table 11 (the cases of using the treated alloy powders immediately after the treatment) and Table 12 (the cases of using the treated alloy powders after two-month storage).

TABLE 11

| | Acid Treatment | | | | Treatment with Treating Agent | | | | |
| --- | --- | --- | --- | --- | --- | --- | --- | --- | --- |
| Experiment No. | Alkali | Alkali concentration (N) | Temperature (° C.) | Time (hr) | Treating agent | Treating agent concentration (wt %) | Treatment temperature (° C.) | Treatment time (min) | 1st-cycle capacity (mAh/g) | 10th-cycle capacity (mAh/g) |
| B-201* | K | 6 | 60 | 5 | D1 | 0.5 | 60 | 60 | 265 | 311 |
| B-202* | K | 6 | 60 | 5 | DPQ | 0.5 | 60 | 60 | 263 | 307 |
| B-203* | K | 6 | 60 | 5 | D2 | 0.5 | 60 | 60 | 258 | 305 |
| B-204* | K | 6 | 60 | 5 | FE | 0.5 | 60 | 60 | 250 | 304 |
| B-205* | K | 6 | 60 | 5 | R | 0.5 | 60 | 60 | 264 | 306 |
| B-206* | K | 6 | 60 | 5 | D2/R | 0.5 | 60 | 60 | 267 | 310 |

*Comparative Examples

TABLE 12

| | Acid Treatment | | | | Treatment with Treating Agent | | | | |
| --- | --- | --- | --- | --- | --- | --- | --- | --- | --- |
| Experiment No. | Alkali | Alkali concentration (N) | Temperature (° C.) | Time (hr) | Treating agent | Treating agent concentration (wt %) | Treatment temperature (° C.) | Treatment time (min) | 1st-cycle capacity (mAh/g) | 10th-cycle capacity (mAh/g) |
| B-211* | K | 6 | 60 | 5 | D1 | 0.5 | 60 | 60 | 265 | 311 |
| B-212* | K | 6 | 60 | 5 | DPQ | 0.5 | 60 | 60 | 262 | 306 |
| B-213* | K | 6 | 60 | 5 | D2 | 0.5 | 60 | 60 | 257 | 305 |
| B-214* | K | 6 | 60 | 5 | FE | 0.5 | 60 | 60 | 250 | 303 |
| B-215* | K | 6 | 60 | 5 | R | 0.5 | 60 | 60 | 264 | 306 |
| B-216* | K | 6 | 60 | 5 | D2/R | 0.5 | 60 | 60 | 267 | 310 |

*Comparative Examples

As demonstrated above, the treatment of a hydrogen absorbing alloy powder in accordance with the present invention can ensure high activity and satisfactory storage characteristics in the alloy powder, the hydrogen absorbing alloy electrode using the thus treated powder can have high initial activity, and these effects of the present treatment are greater than those attained by the successive treatments.

What is claimed is:

1. A method of producing a hydrogen absorbing alloy powder, comprising a step of treating a pulverized hydrogen absorbing alloy with an acidic or alkaline solution of conjugated unsaturated compound having at least 5 conjugated π bonds.

2. A method of producing a hydrogen absorbing alloy powder in accordance with claim 1, wherein said conjugated unsaturated compound has a molecular weight of at least 100.

3. A method of producing a hydrogen absorbing alloy powder in accordance with claim 2, wherein said step is carried out at a temperature of from room temperature to 130° C.

4. A method of producing a hydrogen absorbing alloy powder in accordance with claim 2, wherein said conjugated unsaturated compound is used in an amount of 0.01 to 10 parts by weight per 100 parts by weight of the pulverized hydrogen absorbing alloy.

5. An electrode comprising a hydrogen absorbing alloy powder, said powder having been produced in accordance with a method as described in claim 2.

6. A method of producing a hydrogen absorbing alloy powder in accordance with claim 1, wherein the molecular weight of the conjugated unsaturated compound is at least 200.

7. A method of producing a hydrogen absorbing alloy powder in accordance with claim 6, wherein said step is carried out at a temperature of from room temperature to 130° C.

8. A method of producing a hydrogen absorbing alloy powder in accordance with claim 6, wherein said conjugated unsaturated compound is used in an amount of 0.01 to 10 parts by weight per 100 parts by weight of the pulverized hydrogen absorbing alloy.

9. An electrode comprising a hydrogen absorbing alloy powder, said powder having been produced in accordance with a method as described in claim 6.

10. A method of producing a hydrogen absorbing alloy powder in accordance with claim 1, wherein said conjugated unsaturated compound is at least one compound selected from the group consisting of benzene ring-containing compounds, naphthalene ring-containing compounds, polynuclear aromatic compounds, quinones and nonbenzenoid aromatic compounds, oxygen-containing heterocyclic compounds, nitrogen-containing heterocyclic compounds, sulfur-containing heterocyclic compounds, bicyclic compounds having a nitrogen in common and alkaloids, all of which compounds contain at least 5-conjugated π bonds.

11. A method of producing a hydrogen absorbing alloy powder in accordance with claim 10, wherein said step is carried out at a temperature of from room temperature to 130° C.

12. A method of producing a hydrogen absorbing alloy powder in accordance with claim 10, wherein said conjugated unsaturated compound is used in an amount of 0.01 to 10 parts by weight per 100 parts by weight of the pulverized hydrogen absorbing alloy.

13. A method of producing a hydrogen absorbing alloy powder in accordance with claim 1, wherein said step is carried out at a temperature of from room temperature to 130° C.

14. A method of producing a hydrogen absorbing alloy powder in accordance with claim 1, wherein said conjugated unsaturated compound is used in an amount of 0.01 to 10 parts by weight per 100 parts by weight of the pulverized hydrogen absorbing alloy.

15. A method of producing a hydrogen absorbing alloy powder in accordance with claim 1, wherein said solution is an acidic solution the acidity of which is imparted by at least one acid selected from the group consisting of hydrochloric acid, sulfuric acid and nitric acid.

16. A method of producing a hydrogen absorbing alloy powder in accordance with claim 1, wherein said solution has an acid concentration of from 0.05 to 1.0 normal.

17. A method of producing a hydrogen absorbing alloy powder in accordance with claim 1, wherein said solution is an alkaline solution the alkalinity of which is imparted by at least one hydroxide selected from the group consisting of lithium hydroxide, sodium hydroxide and potassium hydroxide.

18. A method of producing a hydrogen absorbing alloy powder in accordance with claim 1, wherein said solution has an alkali concentration of from 1.0 to 10.0 normal.

19. A method of producing a hydrogen absorbing alloy powder in accordance with claim 1, wherein the pulverized hydrogen absorbing alloy has a composition represented by $(La)_x R_{1-x}(Ni_a M_b)$ wherein R is at least one rare earth element selected from a group consisting of Ce, Pr and Nd, M is at least one metallic element selected from a group consisting of Al, Co, Cu, Fe, Mn, Ti and Zr, x is from 0.2 to 1, a+b is from 4.0 to 6.0 and $0 < b \leq 2.0$.

20. An electrode comprising a hydrogen absorbing alloy powder, said powder having been produced in accordance with a method as described in claim 1.

* * * * *